US012710368B2

(12) United States Patent
Acharya et al.

(10) Patent No.: US 12,710,368 B2
(45) Date of Patent: Aug. 18, 2026

(54) RECYCLING OPTICAL CAVITY, OPTICAL SYSTEM, AND OPTICAL CONSTRUCTION

(71) Applicant: 3M INNOVATIVE PROPERTIES COMPANY, St. Paul, MN (US)

(72) Inventors: Bharat R. Acharya, Woodbury, MN (US); Tonya D. Bonilla, Woodbury, MN (US); Jessica E. DeMay, Minneapolis, MN (US); Stephen M. Kennedy, St. Paul, MN (US); Aaron M. Marcella, White Bear Lake, MN (US); Raj Rajagopal, Woodbury, MN (US); Mark A. Roehrig, Stillwater, MN (US); David A. Rosen, North St. Paul, MN (US); Jonah Shaver, St. Paul, MN (US); Brett J. Sitter, Marine on St. Croix, MN (US); Gregory W. Sitton, Minneapolis, MN (US); Michael L. Steiner, New Richmond, WI (US); John A. Wheatley, Stillwater, MN (US); Zhaohui Yang, North Oaks, MN (US); Antonia E. Schaefer, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 941 days.

(21) Appl. No.: 17/948,572

(22) Filed: Sep. 20, 2022

(65) Prior Publication Data

US 2023/0092755 A1 Mar. 23, 2023

Related U.S. Application Data

(60) Provisional application No. 63/261,516, filed on Sep. 23, 2021.

(51) Int. Cl.
*G02B 17/00* (2006.01)
*G01N 21/33* (2006.01)
(Continued)

(52) U.S. Cl.
CPC ........... *G01N 21/645* (2013.01); *G01N 21/33* (2013.01); *G02B 5/283* (2013.01); *G02B 17/004* (2013.01);
(Continued)

(58) Field of Classification Search
CPC ................ G01N 21/645; G01N 21/33; G01N 2021/6463; G01N 2201/0636;
(Continued)

(56) References Cited

FOREIGN PATENT DOCUMENTS

| | | | |
|---|---|---|---|
| WO | 9214136 | A1 | 8/1992 |
| WO | 2019044969 | A1 | 3/2019 |

*Primary Examiner* — Robert E. Tallman
(74) *Attorney, Agent, or Firm* — Christopher P. Tebow; Robert S. Moshrefzadeh

(57) ABSTRACT

A recycling optical cavity is defined at least by first and second optical films and is configured to receive a test material therein. The test material is configured to emit at least a second light having a second wavelength when irradiated with a first light having a first wavelength. For at least one of s- and p-polarized incident lights incident in an incident plane, and at the first and second wavelengths: at a first incident angle, the first optical film has respective optical transmittances T11(θ1) and T12(θ1), and the second optical film has respective optical transmittances T21(θ1) and T22(θ1), wherein T11(θ1)>T12(θ1), T21(θ1), T22(θ1); and at a second incident angle, the first optical film has respective optical transmittances T11(θ2) and T12(θ2), and the second optical film has respective optical transmittances T21(θ2) and T22(θ2), wherein T21(θ2)>T11(θ2), T12(θ2), T22(θ2).

14 Claims, 10 Drawing Sheets

(51) Int. Cl.
*G01N 21/64* (2006.01)
*G02B 5/28* (2006.01)

(52) U.S. Cl.
CPC ................ *G01N 2021/6463* (2013.01); *G01N 2201/0636* (2013.01)

(58) Field of Classification Search
CPC ............ G01N 2021/6469; G02B 5/283; G02B 17/004; G02B 5/287
See application file for complete search history.

RECYCLING OPTICAL CAVITY, OPTICAL SYSTEM, AND OPTICAL CONSTRUCTION

TECHNICAL FIELD

The present disclosure relates generally to a recycling optical cavity and an optical construction. In particular, the present disclosure relates to an optical system including the recycling optical cavity.

BACKGROUND

In some cases, optical methods are implemented for detection of target analytes, i.e., the presence of target analytes may alter one or more optical characteristics of a light. Conventionally, the light emerging from a test sample including one or more target analytes has a low optical intensity.

SUMMARY

In a first aspect, the present disclosure provides a recycling optical cavity. The recycling optical cavity is defined at least by first and second optical films and configured to receive a test material therein. The test material is configured to emit at least a second light having a second wavelength when irradiated with a first light having a different first wavelength. Each of the first and second optical films includes a plurality of polymeric microlayers numbering at least 10 in total. Each of the polymeric microlayers has an average thickness of less than about 500 nanometers (nm). For at least one of s- and p-polarized incident lights incident in an incident plane, at a first incident angle, and at the first and second wavelengths, the first optical film has respective optical transmittances T11(θ1) and T12(θ1), and the second optical film has respective optical transmittances T21(θ1) and T22(θ1), wherein T11(θ1) is at least 5 times greater than each of T12(θ1), T21(θ1), and T22(θ1). Further, for the at least one of the s- and p-polarized incident lights incident in the incident plane, at a second incident angle different than the first incident angle, and at the first and second wavelengths, the first optical film has respective optical transmittances T11(θ2) and T12(θ2), and the second optical film has respective optical transmittances T21(θ2) and T22(θ2), wherein T21(θ2) is at least 5 times greater than each of T11(θ2), T12(θ2), and T22(θ2). Furthermore, for the at least one of the s- and p-polarized incident lights incident in the incident plane, at a third incident angle different than the first and second incident angles, and at the first and second wavelengths, the first optical film has respective optical transmittances T11(θ3) and T12(θ3), and the second optical film has respective optical transmittances T21(θ3) and T22(θ3), wherein T22(θ3) is at least 5 times greater than each of T11(θ3), T12(θ3), and T21(θ3).

In a second aspect, the present disclosure provides an optical system for sensing a change in optical properties of a test material as a result of external stimuli. The optical system includes a recycling optical cavity including at least first and second optically reflective walls. At least a portion of each of the first and second optically reflective walls includes a plurality of microlayers numbering at least 10 in total. Each of the microlayers has an average thickness of less than about 500 nm. The optical system further includes the test material disposed in the recycling optical cavity and configured to emit at least a second light having a second wavelength L2 when irradiated with a first light having a different first wavelength L1. For at least one of s- and p-polarized incident lights incident in an incident plane at a same first incident angle, an optical transmittance of the plurality of microlayers versus wavelength, for the first optically reflective wall, includes a first band edge along which the transmittance generally decreases with increasing wavelength. The first band edge has a midpoint at a wavelength La. Further for the at least one of the s- and p-polarized incident lights incident in the incident plane at the same first incident angle, an optical transmittance of the plurality of microlayers versus wavelength, for the second optically reflective wall, includes second and third band edges with the transmittance generally decreasing with increasing wavelength along the second band edge and generally increasing with increasing wavelength along the third band edge. The second and third band edges have midpoints at respective wavelengths Lb and Lc, wherein L1<La<Lb<Lc.

In a third aspect, the present disclosure provides an optical system including at least one light source configured to emit a light having at least a first wavelength. The optical system further includes a recycling optical cavity configured to receive the emitted light from the at least one light source. The recycling optical cavity includes at least first and second optically reflective walls. At least a portion of each of the first and second optically reflective walls includes a plurality of microlayers numbering at least 10 in total. Each of the microlayers has an average thickness of less than about 500 nm. The optical system further includes at least one optical detector configured to receive and detect light exiting the recycling optical cavity and having at least the first wavelength and a different second wavelength. For at least one of s- and p-polarized incident lights incident in an incident plane, optical transmittances of the first and second optically reflective walls versus wavelength include first, second, and third transmittance bands having corresponding and non-overlapping full width at half maxima FWHM1, FWHM2, and FWHM3. At a first incident angle, only FWHM1 includes the first wavelength and none of the three FWHMs includes the second wavelength. At a second incident angle different than the first incident angle, only FWHM2 includes the first wavelength and none of the three FWHMs includes the second wavelength. At a third incident angle different than the first and second incident angles, only FWHM3 includes the second wavelength and none of the three FWHMs includes the first wavelength.

In a fourth aspect, the present disclosure provides an optical construction including spaced apart first and second optical films. Each of the first and second optical films includes a plurality of polymeric microlayers numbering at least 100 in total. Each of the polymeric microlayers has an average thickness of less than about 500 nm. A plot of an average layer thickness versus a layer number of the plurality of polymeric microlayers of each of the first and second optical films includes at least two linear portions connected by at least one step portion. Each of the at least two linear portions extends across at least 50 of the polymeric microlayers. For at least one of s- and p-polarized incident lights incident in an incident plane with an incident angle of less than about 75 degrees, optical transmittances of the first and second optical films versus wavelength include respective first and second transmission bands having respective first and second full width at half maxima having respective widths W1 and W2. Each of W1 and W2 is greater than about 30 nm and less than about 300 nm. Any wavelength overlap between the first and second full width at half maxima is less than about 50% of a lesser of W1 and W2.

BRIEF DESCRIPTION OF DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
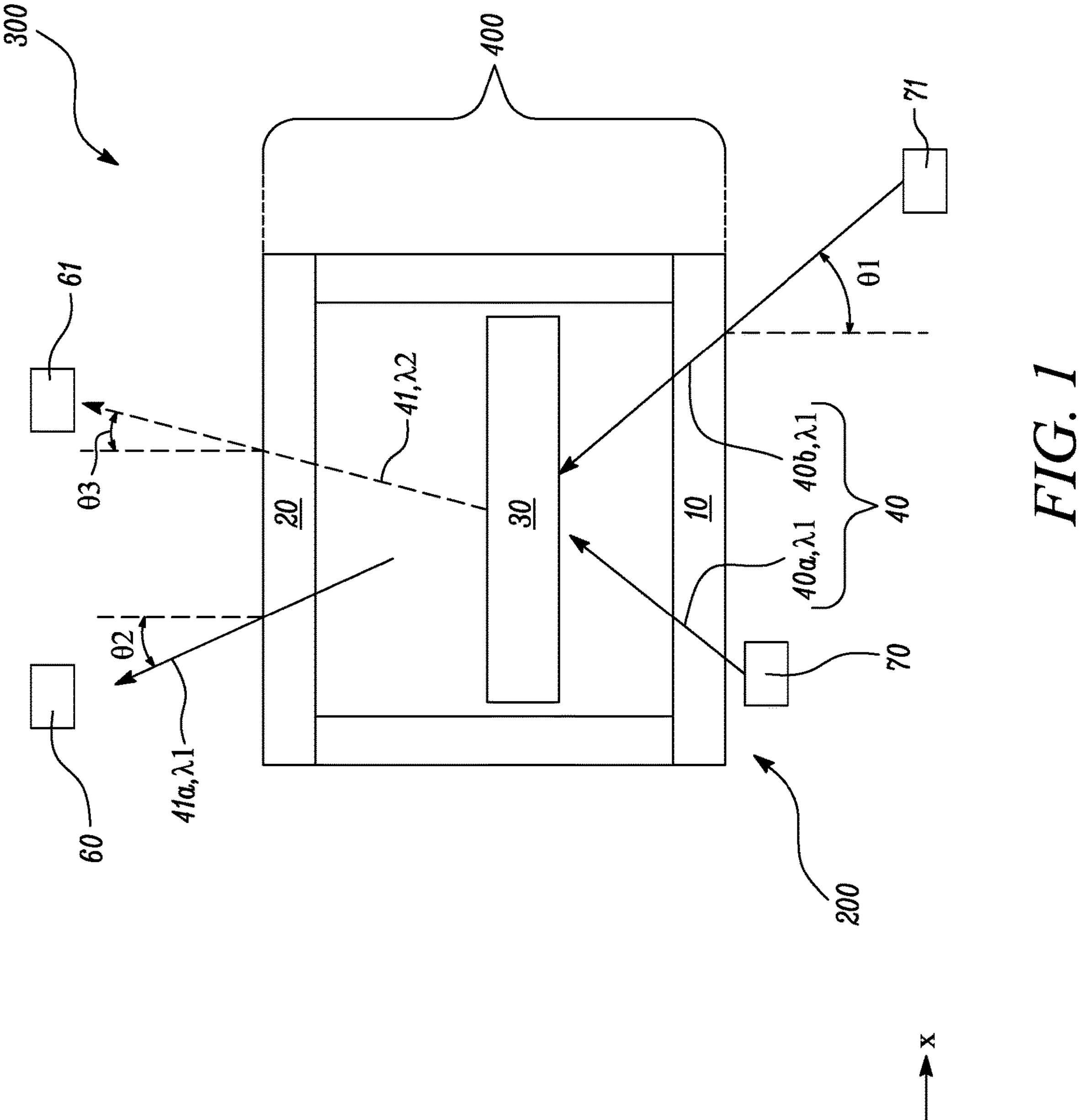
FIG. 1 illustrates a schematic sectional view of an optical system for sensing a test material, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

As used herein, all numbers should be considered modified by the term "about". The term "about", unless otherwise specifically defined, means to a high degree of approximation (e.g., within +/−5% for quantifiable properties) but again without requiring absolute precision or a perfect match.

As used herein, the terms "first", "second", and "third" are used as identifiers. Therefore, such terms should not be construed as limiting of this disclosure. The terms "first", "second", and "third", when used in conjunction with a feature or an element can be interchanged throughout the embodiments of this disclosure.

As used herein, "at least one of A and B" should be understood to mean "only A, only B, or both A and B".

As used herein, the term "between about", unless otherwise specifically defined, generally refers to an inclusive or a closed range. For example, if a parameter X is between about A and B, then $A \leq X \leq B$.

Various optical detection devices and methods are used for detecting or sensing a presence of an analyte. Specifically, it may be important to detect or sense target analytes. One of the conventional techniques for detecting the target analytes is an optical technique. In such a technique, the target analyte may be applied onto a test material, which may include a photoluminescent material. The photoluminescent material may be subjected to a stimulus, such as an optical stimulus. The optical stimulus may include a first light incident on the test material. A portion of the first light may be absorbed by the test material, after which, the test material may emit a second light having a specific wavelength. Generally, the wavelength of the second light is different than a wavelength of the first light.

A sensitivity of detection of the target analyte may depend on a utilization of the first light by molecules of the target analyte. An extent of utilization of the first light may further relate to an optical intensity of the second light by the test material. In some cases, greater utilization of the first light by the test material may result in a greater optical intensity of the emitted second light. Further, a greater optical intensity of the emitted second light may facilitate a better detection of the second light.

In some applications, the test material may be stimulated using sources of light. However, conventional sources of light may generate light having a low optical intensity. Further, not all the light from the sources of light may be absorbed by the test material. Due to the low absorption of the light by the test material, the emitted light may also have of a low optical intensity.

In an aspect, the present disclosure provides a recycling optical cavity. The recycling optical cavity is defined at least by first and second optical films and configured to receive a test material therein. The test material is configured to emit at least a second light having a second wavelength when irradiated with a first light having a different first wavelength. Each of the first and second optical films includes a plurality of polymeric microlayers numbering at least 10 in total. Each of the polymeric microlayers has an average thickness of less than about 500 nanometers (nm). For at least one of s- and p-polarized incident lights incident in an incident plane, at a first incident angle, and at the first and second wavelengths, the first optical film has respective optical transmittances T11(θ1) and T12(θ1), and the second optical film has respective optical transmittances T21(θ1) and T22(θ1), wherein T11(θ1) is at least 5 times greater than each of T12(θ1), T21(θ1), and T22(θ1). Further, for the at least one of the s- and p-polarized incident lights incident in the incident plane, at a second incident angle different than the first incident angle, and at the first and second wavelengths, the first optical film has respective optical transmittances T11(θ2) and T12(θ2), and the second optical film has respective optical transmittances T21(θ2) and T22(θ2), wherein T21(θ2) is at least 5 times greater than each of T11(θ2), T12(θ2), and T22(θ2). Furthermore, for the at least one of the s- and p-polarized incident lights incident in the incident plane, at a third incident angle different than the first and second incident angles, and at the first and second wavelengths, the first optical film has respective optical transmittances T11(θ3) and T12(θ3), and the second optical film has respective optical transmittances T21(θ3) and T22 (θ3), wherein T22(θ3) is at least 5 times greater than each of T11(θ3), T12(θ3), and T21(θ3).

Thus, the first and second optical films may act as spectral as well as angular filters. The first optical film may reduce light from stray light sources or ambient light entering the recycling optical cavity at the first incident angle and allow the second light having the second wavelength and incident at the third incident angle to exit from the recycling optical cavity after being recycled within the recycling optical cavity. The second light exiting the recycling optical cavity may be detected by an optical detector. The recycling of the second light having the second wavelength within the recycling optical cavity may increase an optical intensity of the second light along an angle where the optical detector is located.

Further, the first light may be recycled within the recycling optical cavity and/or may irradiate the test material, thereby increasing a utilization of the first light by the test material. In some cases, greater utilization of the first light by the test material may also increase an optical intensity of the second light. Further, an increased optical intensity of the second light may facilitate a better detection of the second light by the optical detector.

Referring to figures, FIG. 1 illustrates a schematic sectional view of an optical system 300 for sensing a test material 30, according to an embodiment of the present disclosure. The optical system 300 defines mutually orthogonal x-, y-, and z-axes. The x- and y-axes correspond to in-plane axes of the optical system 300, while the z-axis is a transverse axis disposed along a thickness of the optical system 300. In other words, the x- and y-axes are along a plane (i.e., x-y plane) of the optical system 300, and the z-axis is perpendicular to the plane of the optical system 300, i.e., along the thickness of the optical system 300.

In the illustrated embodiment of FIG. 1, the optical system 300 includes two light sources 70, 71 configured to emit a light 40*a* and a light 40*b*, respectively, each of the lights 40*a*, 40*b* having at least a first wavelength λ1. In some embodiments, the optical system 300 includes at least one light source 70, 71 configured to emit the light 40*a*, 40*b* having the at least the first wavelength λ1. In some embodiments, the at least one light source 70, 71 may include any one of the two light sources 70, 71. The two light sources 70, 71 may be collectively referred to as "the at least one light source 70, 71". The lights 40*a*, 40*b* may be collectively referred to as "the light 40".

The optical system 300 further includes at least one optical detector 60, 61. In the illustrated embodiment of FIG. 1, the optical system 300 includes first and second optical detectors 60, 61. Therefore, the at least one optical detector 60, 61 may include the first and second optical detectors 60, 61. The first and second optical detectors 60, 61 may be collectively referred to as "the at least one optical detector 60, 61".

The light 40 may be interchangeably referred to as "the emitted light 40". The optical system 300 further includes a recycling optical cavity 200 configured to receive the emitted light 40 from the at least one light source 70, 71. The recycling optical cavity 200 is defined at least by first and second optical films 10, 20.

The first optical film 10 may be interchangeably referred to as "the first optically reflective wall 10", and the second optical film 20 may be interchangeably referred to as "the second optically reflective wall 20". Therefore, in some embodiments, the recycling optical cavity 200 includes at least the first and second optically reflective walls 10, 20.

The recycling optical cavity 200 is configured to receive the test material 30 therein. In other words, the test material 30 is disposed in the recycling optical cavity 200.

In some embodiments, the optical system 300 may include an optical construction 400. The optical construction 400 includes spaced apart first and second optical films 10, 20. In some embodiments, the optical construction 400 may be equivalent to the recycling optical cavity 200. In some embodiments, the optical construction 400 is configured to receive the test material 30 between the first and second optical films 10, 20. In other words, the test material 30 is disposed in the optical construction 400.

The light 40 may be interchangeably referred to as "the first light 40". The test material 30 is configured to emit at least a second light 41 having a second wavelength λ2 when irradiated with the first light 40 having the different first wavelength λ1.

In some embodiments, the test material 30 may include a photoluminescent material. The photoluminescent material may absorb a photon, excite one of its electrons to a higher energy state, and then radiate a photon as the electron returns to a lower energy state. In other words, the photoluminescent material may emit a light after absorption of photons of an incident light. Such a phenomenon is known as photoluminescence. Generally, an emitted light has a wavelength different from a wavelength of the incident light.

In some embodiments, the photoluminescent material may include quantum dots. When a quantum dot is irradiated with an incident light, electrons in the quantum dot are excited to a higher energy state, and on return of the electrons to an original energy state, an excess energy possessed by the electrons is released as an emitted light. Wavelength of the emitted light depends on a wavelength of the incident light and an energy gap between the original energy state and the higher energy state. The energy gap, in turn, depends on a size of the quantum dot. By varying the size of the quantum dot, for a given wavelength of the incident light, wavelength of the emitted light may be controlled. In some embodiments, quantum dots may be used for down-conversion fluorescence or for up-conversion fluorescence.

In some embodiments, the photoluminescent material may include one or more of a fluorescent material and a phosphorescent material. When subjected to an incident light, the fluorescent material may exhibit fluorescence, and the phosphorescent material may exhibit phosphorescence. Fluorescence may be a relatively fast process, and some amount of energy may be dissipated or absorbed during the process so that the emitted light has an energy different from the absorbed incident light. In phosphorescence, the phosphorescent material may not immediately re-emit the absorbed incident light. Phosphorescence is emission of light from triplet-excited states, in which the electron in the excited orbital has the same spin orientation as the ground-state electron. Transitions to the ground state are spin-forbidden, and the emission rates are relatively slow. The result may be a slow process of radiative transition back to the singlet state, sometimes lasting from milliseconds to seconds to minutes.

In some embodiments, the first wavelength λ1 is L1, and the second wavelength λ2 is L2. In some embodiments, the second wavelength λ2 is greater than the first wavelength λ1 by at least 20 nanometers (nm). In some embodiments, the second wavelength λ2 is greater than the first wavelength λ1 by at least 30 nm, by at least 50 nm, by at least 75 nm, by at least 100 nm, or by at least 125 nm.

In some embodiments, the first wavelength λ1 is a visible wavelength in a visible wavelength range from about 300 nm to about 700 nm. In some embodiments, the first wavelength λ1 is a visible wavelength in a visible wavelength range from about 350 nm to about 700 nm, from about 400 nm to about 680 nm, or from about 420 nm to about 680 nm. In some examples, the first wavelength λ1 is about 630 nm.

In some embodiments, the second wavelength λ2 is an infrared wavelength in an infrared wavelength range from about 700 nm to about 1100 nm. In some examples, the second wavelength λ2 is about 760 nm.

In some embodiments, a light exits from the recycling optical cavity 200. In some embodiments, the light may include the second light 41 having the second wavelength λ2. In some embodiments, the light may further include a light 41*a* having the first wavelength λ1. The light 41*a* may include a portion of the first light 40 that the test material 30 has not utilized or converted to the second light 41. Therefore, the light exiting the recycling optical cavity 200 may be referred to as "the light 41, 41*a* exiting the recycling cavity 200". The at least one optical detector 60, 61 is configured to receive and detect the light 41, 41*a* exiting the recycling optical cavity 200 having at least the first wavelength λ1 and the different second wavelength λ2, respectively.

In the illustrated embodiment of FIG. 1, the first light 40 is incident on the first optical film 10 at a first incident angle θ1. The light 41*a* exiting the recycling optical cavity 200 towards the first optical detector 60 is incident on the second optical film 20 at a second incident angle θ2. The second light 41 exiting the recycling optical cavity 200 towards the second optical detector 61 is incident on the second optical film 20 at a third incident angle θ3.

Figure 2:
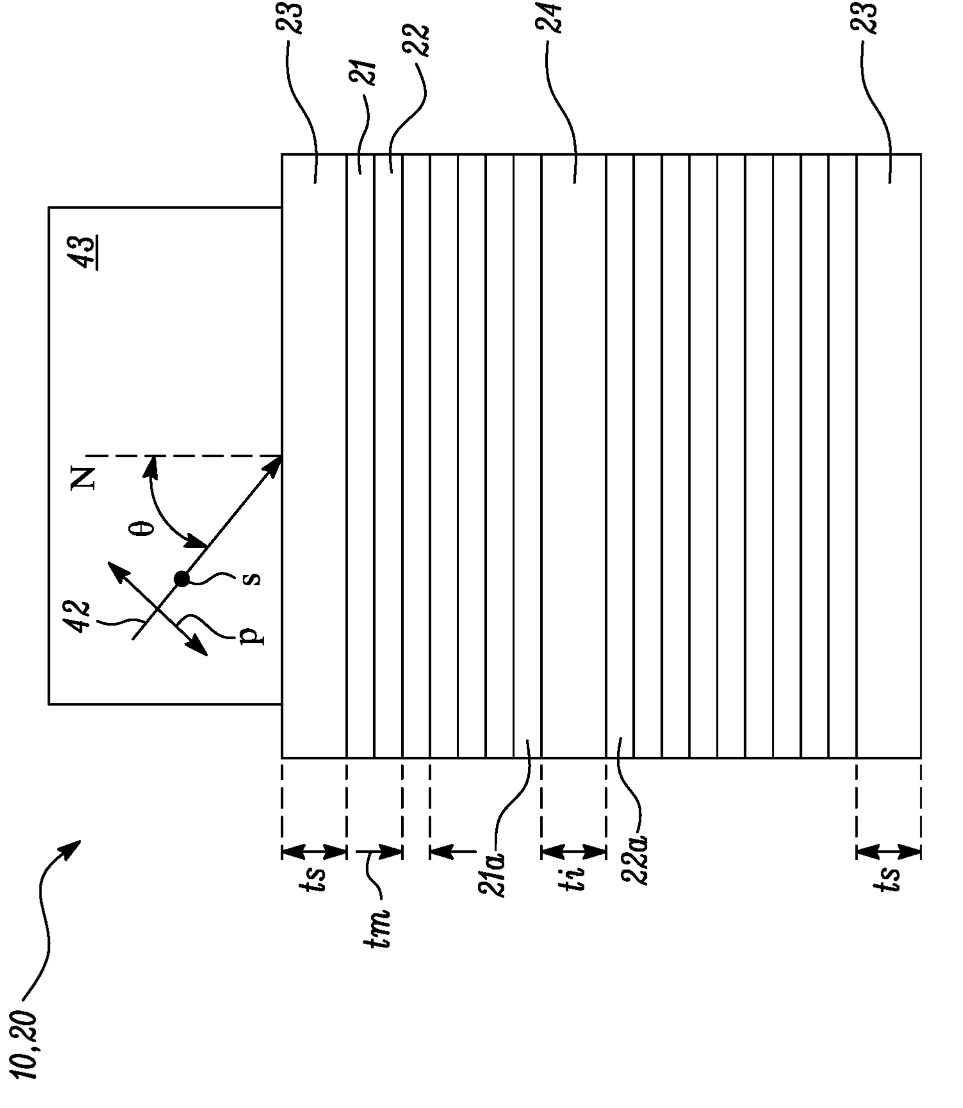
FIG. 2 illustrates a detailed schematic sectional view of first and second optical films of the optical system of FIG. 1, according to an embodiment of the present disclosure.
Figure 2:
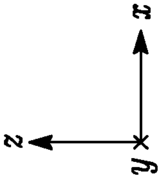

FIG. 2 illustrates a detailed schematic sectional view of the first and second optical films 10, 20 of the optical system 300 (shown in FIG. 1), according to an embodiment of the present disclosure.

In some embodiments, at least a portion of each of the first and second optically reflective walls 10, 20 includes a plurality of microlayers 21, 22. In some embodiments, each of the first and second optical films 10, 20 includes the plurality of microlayers 21, 22. In some embodiments, the plurality of microlayers 21, 22 is a plurality of polymeric microlayers 21, 22. The plurality of microlayers 21, 22 may be interchangeably referred to as "the plurality of polymeric microlayers 21, 22".

In some embodiments, the plurality of microlayers 21, 22 numbers at least 10 in total. In some embodiments, the plurality of microlayers 21, 22 numbers at least 20, at least 30, at least 40, at least 50, at least 100, at least 200, at least 300, at least 400, at least 500, or at least 600 in total. In some embodiments, each of the first and second optical films 10, 20 includes the plurality of polymeric microlayers 21, 22 numbering at least 100 in total.

Further, each of the polymeric microlayers 21, 22 has an average thickness tm of less than about 500 nm. The average thickness tm is defined along the z-axis of each of the polymeric microlayers 21, 22. The term "average thickness tm", as used herein, refers to an average of thicknesses measured at multiple points across a plane (i.e., the x-y plane) of each of the polymeric microlayers 21, 22. In some embodiments, each of the polymeric microlayers 21, 22 has the average thickness tm of less than about 450 nm, less than about 400 nm, less than about 350 nm, less than about 300 nm, less than about 250 nm, or less than about 200 nm. In some embodiments, each of the polymeric microlayers 21, 22 has the average thickness tm of between about 25 nm and about 250 nm. In some embodiments, each of the microlayers 21, 22 has the average thickness tm of less than about 400 nm, less than about 300 nm, less than about 200 nm, less than about 100 nm, less than about 50 nm, less than about 40 nm, less than about 30 nm, or less than about 20 nm.

Further, in some embodiments, the plurality of polymeric microlayers 21, 22 of each of the first and second optical films 10, 20 includes a plurality of alternating polymeric A- and B-microlayers 21, 22. The plurality of polymeric A-microlayers 21 may be interchangeably referred to as "the A-microlayers 21", and the plurality of polymeric B-microlayers 22 may be interchangeably referred to as "the B-microlayers 22".

In some embodiments, the A-microlayers 21 include polyethylene terephthalate (PET) or a copolymer of PET. In some embodiments, the A-microlayers 21 may include polyethylene naphthalate (PEN), or LmPEN (a stoichiometric reactor blend of about 90% of PEN and about 10% of PET). In some embodiments, the B-microlayers 22 include polymethyl methacrylate (PMMA) or a copolymer of PMMA.

In some embodiments, each of the first and second optical films 10, 20 further includes at least one skin layer 23 having an average thickness ts of greater than about 500 nm. The average thickness ts is defined along the z-axis of the at least one skin layer 23. The term "average thickness ts", as used herein, refers to an average of thicknesses measured at multiple points across a plane (i.e., the x-y plane) of the at least one skin layer 23. In some embodiments, the at least one skin layer 23 has the average thickness ts of greater than about 750 nm, greater than about 1000 nm, greater than about 1500 nm, or greater than about 2000 nm. The at least one skin layer 23 may act as a protective layer for the for the plurality of polymeric microlayers 21, 22. In the illustrated embodiment of FIG. 2, the first and second optical films 10, 20 include a pair of opposing skin layers 23. The pair of skin layers 23 of the first and second optical films 10, 20 may act as protective boundary layers (PBL).

In some embodiments, the first optical film 10 further includes at least one intermediate layer 24 disposed between two of the polymeric microlayers 21, 22. In the illustrated embodiment of FIG. 2, the first optical film 10 includes one intermediate layer 24 disposed between polymeric A- and B-microlayers 21*a*, 22*a*. In some embodiments, the at least one intermediate layer 24 has an average thickness ti of greater than about 500 nm. The average thickness ti is defined along the z-axis of the at least one intermediate layer 24. The term "average thickness ti", as used herein, refers to an average of thicknesses measured at multiple points across a plane (i.e., the x-y plane) of the at least one intermediate layer 24. In some embodiments, the at least one intermediate layer 24 has the average thickness ti of greater than about 750 nm, greater than about 1000 nm, greater than about 1500 nm, or greater than about 2000 nm.

In some embodiments, the polymeric A- and B-microlayers 21, 22 have respective indices nxA and nxB along the same in-plane x-axis. In some embodiments, the polymeric A- and B-microlayers 21, 22 have respective indices nyA and nyB along the same in-plane y-axis orthogonal to the x-axis. In some embodiments, the polymeric A- and B-microlayers 21, 22 have respective indices nzA and nzB along the z-axis orthogonal to the x- and y-axes.

In some embodiments, for at least one of the first and second wavelengths λ1, λ2, nzA is less than each of nxA and nyA by at least about 0.05, i.e., $(nxA-nzA)\geq 0.05$ and $(nyA-nzA)\geq 0.05$.

In some embodiments, for the at least one of the first and second wavelengths λ1, λ2, a magnitude of a difference between nxA and nyA is less than about 0.03, i.e., $|nxA-nyA|<0.03$. In some embodiments, for the at least one of the first and second wavelengths λ1, λ2, nxA may be substantially equal to nyA.

In some embodiments, for the at least one of the first and second wavelengths λ1, λ2, a magnitude of a maximum difference between nxB, nyB, nzB is less than about 0.02, i.e., $\max(|nxB-nyB|, |nyB-nzB|, |nzB-nxB|)<0.02$. In some embodiments, for the at least one of the first and second wavelengths λ1, λ2, nxB may be substantially equal to nyB. In some embodiments, for the at least one of the first and second wavelengths λ1, λ2, nyB may be substantially equal to nzB. In some embodiments, for the at least one of the first and second wavelengths λ1, λ2, nzB may be substantially equal to nxB. In some cases, each polymeric B-microlayer 22 may be a substantially isotropic layer, i.e., for the at least one of the first and second wavelengths λ1, λ2, nxB, nyB, nzB may be substantially equal to each other.

In some embodiments, for the at least one of the first and second wavelengths λ1, λ2, nxA is greater than nxB by at least about 0.12, i.e., $(nxA-nxB)\geq 0.12$.

In some embodiments, for the at least one of the first and second wavelengths λ1, λ2 of about 630 nm, nxA is about 1.65, nxB is about 1.49, nyA is about 1.65, nyB is about 1.49, nzA is about 1.51, and nzB is about 1.49.

The first and second optical films 10, 20 may have any suitable total thickness based on desired application attributes. In some embodiments, desired optical properties of the first and second optical films 10, 20 may be achieved by varying various parameters, such as at least one of materials and average thicknesses of the plurality of alternating polymeric A- and B-microlayers 21, 22, the at least one skin layer 23, and the at least one intermediate layer 24. Further, the desired optical properties of the first and second optical films 10, 20 may be achieved by varying the total number of the plurality of alternating polymeric A- and B-microlayers 21, 22, and at least one of the refractive indices nxA, nyA, nzA, nxB, nyB, and nzB of the plurality of polymeric microlayers 21, 22.

Specifically, the desired optical properties of the multilayer optical film 10 may be varied by varying the total number of the polymeric A- and B-microlayers 21, 22 and the average thicknesses of at least one of the polymeric A- and B-microlayers 21, 22.

FIG. 2 further illustrates an incident light 42 incident in an incident plane 43 and incident on the first and second optical films 10, 20 at an incident angle θ with respect to a normal N to the first and second optical films 10, 20. In some embodiments, the normal N is substantially along the z-axis of the first and second optical films 10, 20.

In some embodiments, the incident light 42 incident in the incident plane 43 may be a s-polarized incident light. In such embodiments, the incident light 42 may be interchangeably referred to as "the s-polarized incident light 42". In some embodiments, the incident light 42 incident in the incident plane 43 may be a p-polarized incident light. In such embodiments, the incident light 42 may be interchangeably referred to as "the p-polarized incident light 42".

Referring to FIGS. 1 and 2, in some embodiments, the incident angle θ may be the first incident angle θ1, the second incident angle θ2, or the third incident angle θ3. In some embodiments, the third incident angle θ3 is greater than the second incident angle θ2, and the second incident angle θ2 is greater than the first incident angle θ1.

In some embodiments, the first incident angle θ1 is less than about 20 degrees. In some embodiments, the first incident angle θ1 is less than about 15 degrees, less than about 10 degrees, or less than about 5 degrees.

In some embodiments, the second incident angle θ2 is between about 25 degrees and about 50 degrees. In some embodiments, the second incident angle θ2 is between about 30 degrees and about 50 degrees, or between about 35 degrees and about 45 degrees.

In some embodiments, the third incident angle θ3 is greater than about 40 degrees. In some embodiments, the third incident angle θ3 is greater than about 45 degrees, greater than about 50 degrees, or greater than about 55 degrees.

Figure 3A:
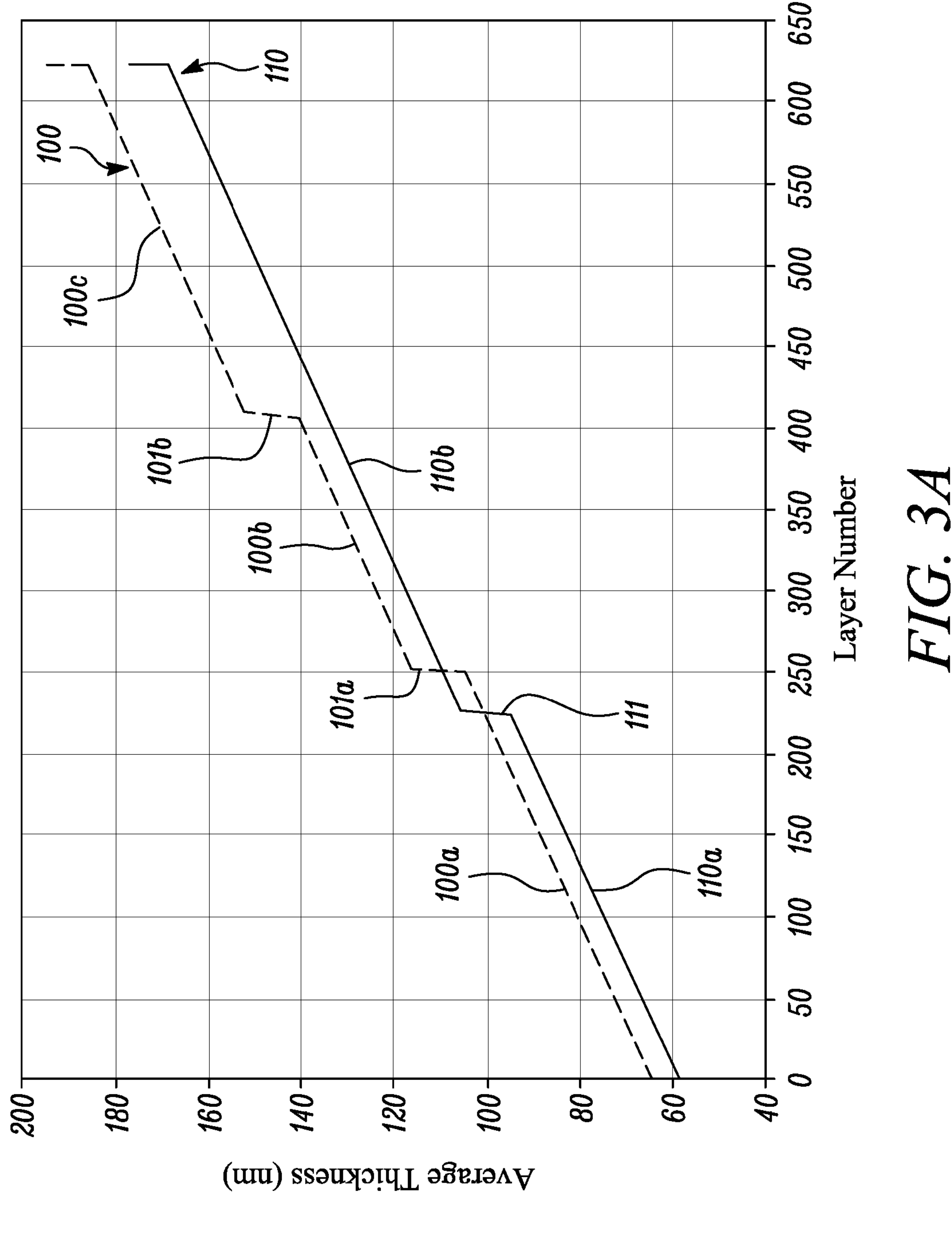
FIG. 3A illustrates a graph including respective plots depicting an average layer thickness versus a layer number of a plurality of polymeric microlayers of the first and second optical films, according to an embodiment of the present disclosure.

FIG. 3A illustrates a graph 310 including respective plots 110, 100 depicting an average layer thickness versus a layer number of the plurality of polymeric microlayers 21, 22 (shown in FIG. 2) of the first and second optical films 10, 20 (shown in FIG. 2), according to an embodiment of the present disclosure. The average thickness of the first and second polymeric microlayers 21, 22 is depicted in nanometers (nm) on the ordinate axis, and the layer number is depicted on the abscissa.

In some embodiments, the polymeric microlayers 21, 22 of the first and second optical films 10, 20 number N1 and N2 in total, respectively. In some embodiments, a magnitude of a difference between N1 and N2 is less than about 100, i.e., $|N1-N2|<100$. In some embodiments, the magnitude of the difference between N1 and N2 is less than about 80, less than about 60, less than about 40, less than about 20, or less than about 10. In some embodiments, N1 may be equal to N2. In the illustrated embodiment of FIG. 3A, each of N1 and N2 is about 625, and therefore $|N1-N2|$ is 0.

In some embodiments, the plot 110, 100 of the average layer thickness versus the layer number of the plurality of polymeric microlayers 21, 22 of at least one of the first and second optical films 10, 20 has a substantially piecewise linear profile over at least 70% of the plot 110, 100. In some embodiments, the plot 110, 100 of the average layer thickness versus the layer number of the plurality of polymeric microlayers 21, 22 of at least one of the first and second optical films 10, 20 has the substantially piecewise linear profile over at least 75%, at least 80%, at least 85%, at least 90%, or at least 95% of the plot 110, 100.

In some embodiments, the plot 110, 100 of the average layer thickness versus the layer number of the plurality of polymeric microlayers 21, 22 of each of the first and second optical films 10, 20 has the substantially piecewise linear profile over at least 70% of the plot 110, 100. In some embodiments, the plot 110, 100 of the average layer thickness versus the layer number of the plurality of polymeric microlayers 21, 22 of each of the first and second optical films 10, 20 has the substantially piecewise linear profile over at least 75%, at least 80%, at least 85%, at least 90%, or at least 95% of the plot 110, 100.

In the illustrated embodiment of FIG. 3A, the plots 110, 100 of the average layer thickness versus the layer number of the plurality of polymeric microlayers 21, 22 of the first and second optical films 10, 20, respectively, have the substantially piecewise linear profile over about 100% of the plots 110, 100.

In some embodiments, the plot 110, 100 of the average layer thickness versus the layer number of the plurality of polymeric microlayers 21, 22 of each of the first and second optical films 10, 20 includes at least two linear portions connected by at least one step portion. Each of the at least two linear portions extends across at least 50 of the polymeric microlayers 21, 22. In some embodiments, each of the at least two linear portions extends across at least 75, at least 100, at least 125, at least 150, at least 175, or at least 200 of the polymeric microlayers 21, 22.

In some embodiments, the plot 110, 100 of the average layer thickness versus the layer number of the plurality of polymeric microlayers 21, 22 of one of the first and second optical films 10, 20 includes more linear portions than the other one of the first and second optical films 10, 20.

In some embodiments, the plot 110, 100 of the average layer thickness versus the layer number of the plurality of polymeric microlayers 21, 22 of one of the first and second optical films 10, 20 includes only two linear portions connected by one step portion, and the plot 110, 100 of the average layer thickness versus the layer number of the plurality of polymeric microlayers 21, 22 of the other one of the first and second optical films 10, 20 includes only three linear portions connected by two step portions.

In the illustrated embodiment of FIG. 3A, the plot 110 of the average layer thickness versus the layer number of the plurality of polymeric microlayers 21, 22 of the first optical film 10 includes two linear portions 110*a*, 110*b* connected by a step portion 111. The linear portion 110*a* extends across about 225 of the polymeric microlayers 21, 22, and the linear portion 110*b* extends across about 400 of the polymeric microlayers 21, 22.

Further, in the illustrated embodiment of FIG. 3A, the plot 100 of the average layer thickness versus the layer number of the plurality of polymeric microlayers 21, 22 of the second optical film 20 includes three linear portions 100*a*, 100*b*, 100*c*. The linear portions 100*a*, 100*b* are connected by a step portion 101*a*, and the linear portions 100*b*, 100*c* are connected by a step portion 101*b*. The linear portion 100*a* extends across about 250 of the polymeric microlayers 21, 22, the linear portion 100*b* extends across about 155 of the polymeric microlayers 21, 22, and the linear portion 100*c* extends across about 220 of the polymeric microlayers 21, 22.

Figure 3B:
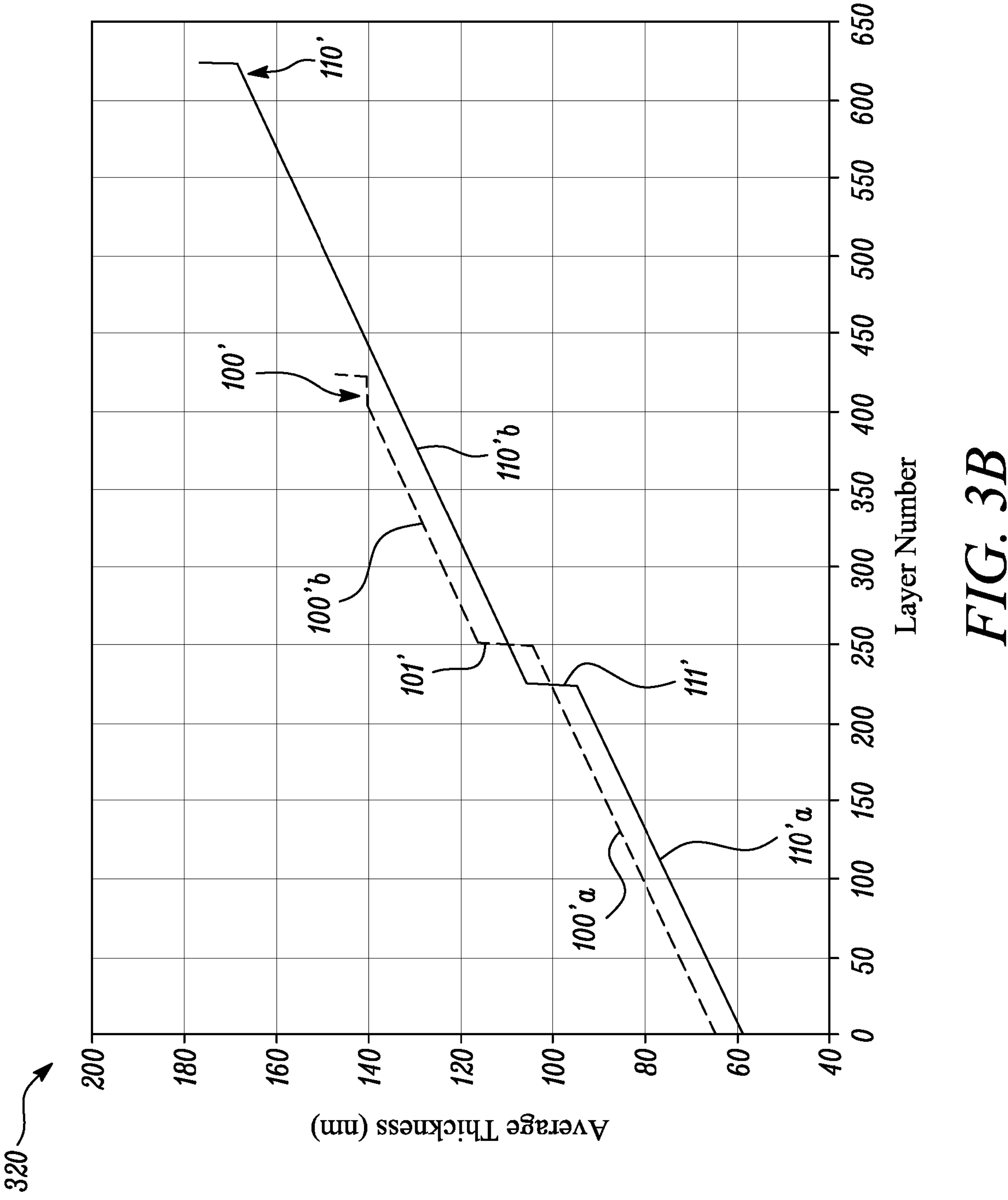
FIG. 3B illustrates a graph including respective plots depicting an average layer thickness versus a layer number of the plurality of polymeric microlayers of the first and second optical films, according to another embodiment of the present disclosure.

FIG. 3B illustrates a graph 320 including respective plots 110', 100' depicting an average layer thickness versus a layer number of the plurality of polymeric microlayers 21, 22 (shown in FIG. 2) of the first and second optical films 10, 20 (shown in FIG. 2), according to another embodiment of the present disclosure. The average thickness of the first and second polymeric microlayers 21, 22 is depicted in nanometers (nm) on the ordinate axis, and the layer number is depicted on the abscissa.

As discussed above, the polymeric microlayers 21, 22 of the first and second optical films 10, 20 number N1 and N2 in total, respectively. In some embodiments, a magnitude of a difference between N1 and N2 is greater than about 50, i.e., $|N1-N2|>50$. In some embodiments, the magnitude of the difference between N1 and N2 is greater than about 75, greater than about 100, greater than about 125, greater than about 150, greater than about 175, greater than about 200, greater than about 225, or greater than about 250. In the illustrated embodiment of FIG. 3B, N1 is about 625, N2 is about 425. Therefore, $|N1-N2|$ is 200.

In the illustrated embodiment of FIG. 3B, the plots 110', 100' of the average layer thickness versus the layer number of the plurality of polymeric microlayers 21, 22 of the first and second optical films 10, 20, respectively, have the substantially piecewise linear profile over about 100% of the plots 110', 100'.

The plot 110', 100' of the average layer thickness versus the layer number of the plurality of polymeric microlayers 21, 22 of each of the first and second optical films 10, 20 includes at least two linear portions connected by at least one step portion. Each of the at least two linear portions extends across at least 50 of the polymeric microlayers 21, 22.

In some embodiments, the plot 110', 100' of the average layer thickness versus the layer number of the plurality of polymeric microlayers 21, 22 of each of the first and second optical films 10, 20 includes only two linear portions connected by one step portion.

In the illustrated embodiment of FIG. 3B, the plot 110' of the average layer thickness versus the layer number of the plurality of polymeric microlayers 21, 22 of the first optical film 10 includes two linear portions 110'*a*, 110'*b* connected by one step portion 111'. The linear portion 110'*a* extends across about 225 of the polymeric microlayers 21, 22, and the linear portion 110'*b* extends across about 400 of the polymeric microlayers 21, 22.

Further, in the illustrated embodiment of FIG. 3B, the plot 100' of the average layer thickness versus the layer number of the plurality of polymeric microlayers 21, 22 of the second optical film 20 includes two linear portions 100'*a*, 100'*b* connected by one step portion 101'. The linear portion 100'*a* extends across about 250 of the polymeric microlayers 21, 22, and the linear portion 100'*b* extends across about 175 of the polymeric microlayers 21, 22.

Figure 4A:
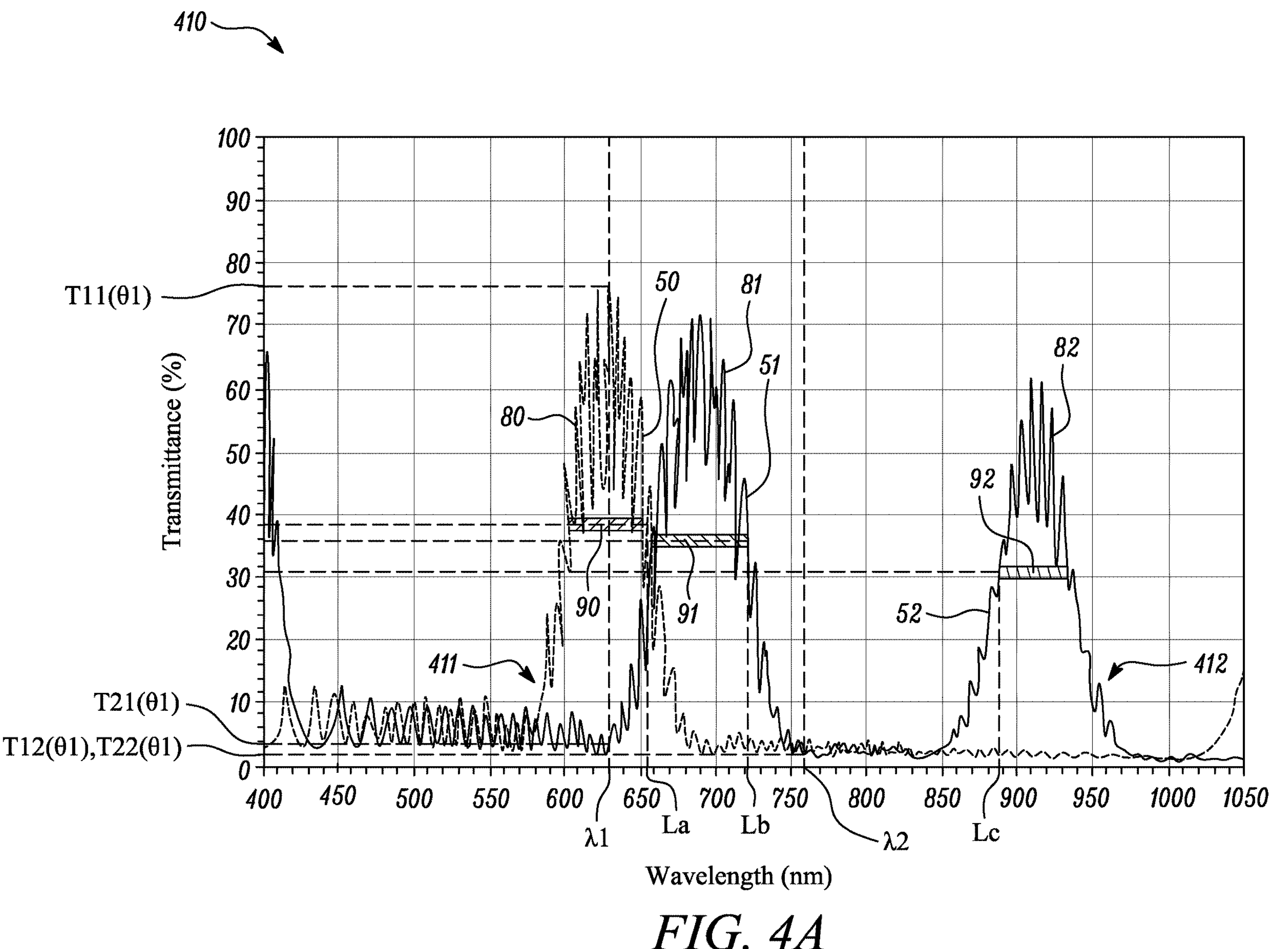
FIG. 4A illustrates a plot depicting respective optical transmittances versus wavelength of the first and second optical films for an incident light incident in an incident plane at a first incident angle, according to an embodiment of the present disclosure.

FIG. 4A illustrates a plot 410 depicting respective optical transmittances versus wavelength of the first and second optical films 10, 20 (shown in FIG. 1), for the incident light 42 (shown in FIG. 2) incident in the incident plane 43 (shown in FIG. 2) at the first incident angle θ1 (shown in FIG. 1), according to an embodiment of the present disclosure. Specifically, the plot 410 illustrates the optical transmittances versus wavelength of the first and second optical films 10, 20, respectively, for at least one of the s- and p-polarized incident lights 42 incident in the incident plane 43 at the first incident angle θ1. Wavelength is expressed in nanometers (nm) in the abscissa. Optical transmittance is expressed as a transmittance percentage in the left ordinate axis.

Referring now to FIGS. 1, 2, 3A, and 4A, the plot 410 includes a curve 411 corresponding to the optical transmittance of the first optical film 10 for the at least one of the s- and p-polarized incident lights 42 incident in the incident plane 43 at the first incident angle θ1. The curve 411 may interchangeably be referred to as "the optical transmittance of the first optical film versus wavelength 411", "the optical transmittance versus wavelength 411", or "the optical transmittance of the plurality of microlayers versus wavelength 411" of the first optical film 10.

The plot 410 further includes a curve 412 corresponding to the optical transmittance of the second optical film 20 for the at least one of the s- and p-polarized incident lights 42 incident in the incident plane 43 at the first incident angle $\theta 1$. The curve 412 may interchangeably be referred to as "the optical transmittance of the second optical film versus wavelength 412", "the optical transmittance versus wavelength 412", or "the optical transmittance of the plurality of microlayers versus wavelength 412" of the second optical film 20.

For the at least one of the s- and p-polarized incident lights 42 incident in the incident plane 43, at the first incident angle $\theta 1$, and at the first and second wavelengths $\lambda 1$, $\lambda 2$, the first optical film 10 has respective optical transmittances $T11(\theta 1)$ and $T12(\theta 1)$, and the second optical film 20 has respective optical transmittances $T21(\theta 1)$ and $T22(\theta 1)$.

$T11(\theta 1)$ is at least 5 times greater than each of $T12(\theta 1)$, $T21(\theta 1)$, and $T22(\theta 1)$, i.e., $T11(\theta 1) \geq 5\ T12(\theta 1)$, $T11(\theta 1) \geq 5\ T21(\theta 1)$ and $T11(\theta 1) \geq 5\ T22(\theta 1)$. In some embodiments, $T11(61)$ is at least 10 times, at least 15 times, at least 20 times, at least 30 times, at least 40 times, at least 50 times, at least 100 times, at least 250 times, or at least 500 times greater than each of $T12(\theta 1)$, $T21(\theta 1)$, and $T22(\theta 1)$.

In the illustrated embodiment of FIG. 4A, for the at least one of the s- and p-polarized incident lights 42 incident in the incident plane 43, at the first incident angle $\theta 1$ of about 0 degree, and at the first and second wavelengths $\lambda 1$, $\lambda 2$ of about 630 nm and about 760 nm, respectively, the first optical film 10 has respective optical transmittances $T11(\theta 1)$ of about 76% and $T12(\theta 1)$ of about 2%, and the second optical film 20 has respective optical transmittances $T21(\theta 1)$ of about 4% and $T22(\theta 1)$ of about 2%.

Therefore, as is apparent from the plot 410, for the first wavelength $\lambda 1$, the first optical film 10 substantially transmits the at least one of the s- and p-polarized incident lights 42 incident in the incident plane 43 at the first incident angle $\theta 1$. Further, for the second wavelength $\lambda 2$, the first optical film 10 substantially reflects the at least one of the s- and p-polarized incident lights 42 incident in the incident plane 43 at the first incident angle $\theta 1$. Furthermore, for each of the first and second wavelengths $\lambda 1$, $\lambda 2$, the second optical film 20 substantially reflects the at least one of the s- and p-polarized incident lights 42 incident in the incident plane 43 at the first incident angle $\theta 1$.

Therefore, the first optical film 10 substantially transmits the first light 40 having the first wavelength $\lambda 1$ from the at least one light source 70, 71, when the first light 40 is incident on the first optical film 10 at the first incident angle $\theta 1$. This may allow the first light 40 to enter the recycling optical cavity 200 and irradiate the test material 30, such that the test material 30 emits the second light 41 having at least the second wavelength $\lambda 2$. Thus, the first optical film 10 may act as a spectral as well as an angular filter thereby, reducing light from stray light sources or ambient light entering the recycling optical cavity 200.

Further, a portion of the second light 41 having the second wavelength $\lambda 2$ may be emitted towards the first optical film 10 and may be incident on the first optical film 10 at the first incident angle $\theta 1$. The first optical film 10 may substantially reflect the portion of the second light 41 having the second wavelength $\lambda 2$ and incident at the first incident angle $\theta 1$ towards the second optical film 20.

Furthermore, a remaining portion of the second light 41 having the second wavelength $\lambda 2$ may be emitted towards the second optical film 20. The second optical film 20 may substantially reflect the remaining portion of the second light 41 incident at the first incident angle $\theta 1$. Thus, the second light 41 having the second wavelength $\lambda 2$ and incident at the first incident angle $\theta 1$ may be recycled in the recycling optical cavity 200.

In addition, the second optical film 20 may substantially reflect the first light 40 having the first wavelength $\lambda 1$ back towards the test material 30, thereby increasing a utilization of the first light 40 by the test material 30.

In some embodiments, for the at least one of the s- and p-polarized incident lights 42 incident in the incident plane 43 at the first incident angle $\theta 1$, the optical transmittance of the plurality of microlayers versus wavelength 411 for the first optically reflective wall 10 includes a first band edge 50 along which the transmittance generally decreases with increasing wavelength. The first band edge 50 has a midpoint at a wavelength La. The midpoint of the first band edge 50 may correspond to the half of a peak value of optical transmittance of the first band edge 50.

In some embodiments, for the at least one of the s- and p-polarized incident lights 42 incident in the incident plane 43 at the first incident angle $\theta 1$, the optical transmittance of the plurality of microlayers versus wavelength 412 for the second optically reflective wall 20 includes second and third band edges 51, 52 with the transmittance generally decreasing with increasing wavelength along the second band edge 51 and generally increasing with increasing wavelength along the third band edge 52. The second and third band edges 51, 52 have midpoints at respective wavelengths Lb and Lc. The midpoint of the second band edge 51 may correspond to the half of a peak value of optical transmittance of the second band edge 51. Similarly, the midpoint of the third band edge 52 may correspond to the half of a peak value of optical transmittance of the third band edge 52. The wavelength Lc is less than the wavelength Lb, the wavelength Lb is less than the wavelength La, and the wavelength La is less than the first wavelength L1, i.e., $L1 < La < Lb < Lc$. In the illustrated embodiment of FIG. 4A, L1 is equivalent to the first wavelength $\lambda 1$ of about 630 nm, La is about 655 nm, Lb is about 720 nm, and Lc is about 885 nm.

In some embodiments, for the at least one of the s- and p-polarized incident lights 42 incident in the incident plane 43 at the first incident angle $\theta 1$, the optical transmittances at the midpoints of the first, second, and third band edges 50, 51, 52 are between about 20% and about 60%. In some embodiments, for the at least one of the s- and p-polarized incident lights 42 incident in the incident plane 43 at the first incident angle $\theta 1$, the optical transmittances at the midpoints of the first, second, and third band edges 50, 51, 52 are between about 25% and about 55%, or between about 30% and about 50%. In the illustrated embodiment of FIG. 4A, for the at least one of the s- and p-polarized incident lights 42 incident in the incident plane 43 at the first incident angle $\theta 1$, the optical transmittances at the midpoints of the first, second, and third band edges 50, 51, 52 are about 38%, about 36%, and about 31%, respectively.

In some embodiments, the first band edge 50 is a right band edge of a transmission band 80 of the first optically reflective wall 10. The transmission band 80 has a corresponding full width at half maximum (FWHM) 90 of greater than about 30 nm and less than about 300 nm. In some embodiments, the FWHM 90 is greater than about 35 nm, greater than about 40 nm, greater than about 45 nm, or greater than about 50 nm and less than about 250 nm, less than about 200 nm, or less than about 150 nm. In the illustrated embodiment of FIG. 4A, the FWHM 90 is about 50 nm.

In some embodiments, the second band edge 51 is a right band edge of a transmission band 81 of the second optically reflective wall 20. The transmission band 81 has a corresponding FWHM 91 of greater than about 30 nm and less than about 300 nm. In some embodiments, the FWHM 91 is greater than about 35 nm, greater than about 40 nm, greater than about 45 nm, or greater than about 50 nm and less than about 250 nm, less than about 200 nm, or less than about 150 nm. In the illustrated embodiment of FIG. 4A, the FWHM 91 is about 60 nm.

In some embodiments, the third band edge 52 is a left band edge of a transmission band 82 of the second optically reflective wall 20. The transmission band 82 has a corresponding FWHM 92 of greater than about 30 nm and less than about 300 nm. In some embodiments, the FWHM 92 is greater than about 35 nm, greater than about 40 nm, greater than about 45 nm, or greater than about 50 nm and less than about 250 nm, less than about 200 nm, or less than about 150 nm. In the illustrated embodiment of FIG. 4A, the FWHM 92 is about 50 nm.

In some embodiments, the FWHMs of the first, second, and third transmission bands 80, 81, 82 may be referred to as FWHM1, FWHM2, FWHM3, respectively. Therefore, the FWHM 90 may be interchangeably referred to as "the FWHM1 90", the FWHM 91 may be interchangeably referred to as "the FWHM2 91", and the FWHM 92 may be interchangeably referred to as "the FWHM3 92".

In some embodiments, for the at least one of the s- and p-polarized incident lights 42 incident in the incident plane 43, the optical transmittances of the first and second optically reflective walls versus wavelength 411, 412 include the first, second, and third transmittance bands 80, 81, 82 having corresponding and nonoverlapping FWHMs FWHM1 90, FWHM2 91, and FWHM3 92. Specifically, in the illustrated embodiment of FIG. 4A, the FWHM1 of the first transmittance band 80 corresponds to FWHM 90. The FWHM2 of the second transmittance band 81 corresponds to FWHM 91. The FWHM3 of the third transmittance band 82 corresponds to FWHM 92. At the first incident angle θ1, only FWHM1 90 includes the first wavelength λ1 and none of the three FWHMs FWHM 90, FWHM 91, FWHM 92 includes the second wavelength λ2. In some embodiments, each of the FWHM1 90, FWHM2 91, and FWHM3 92 is greater than about 30 nm and less than about 300 nm. In some embodiments, each of the FWHM1 90, FWHM2 91, and FWHM3 92 is greater than about 35 nm, greater than about 40 nm, greater than about 45 nm, or greater than about 50 nm and less than about 250 nm, less than about 200 nm, or less than about 150 nm.

Figure 4B:
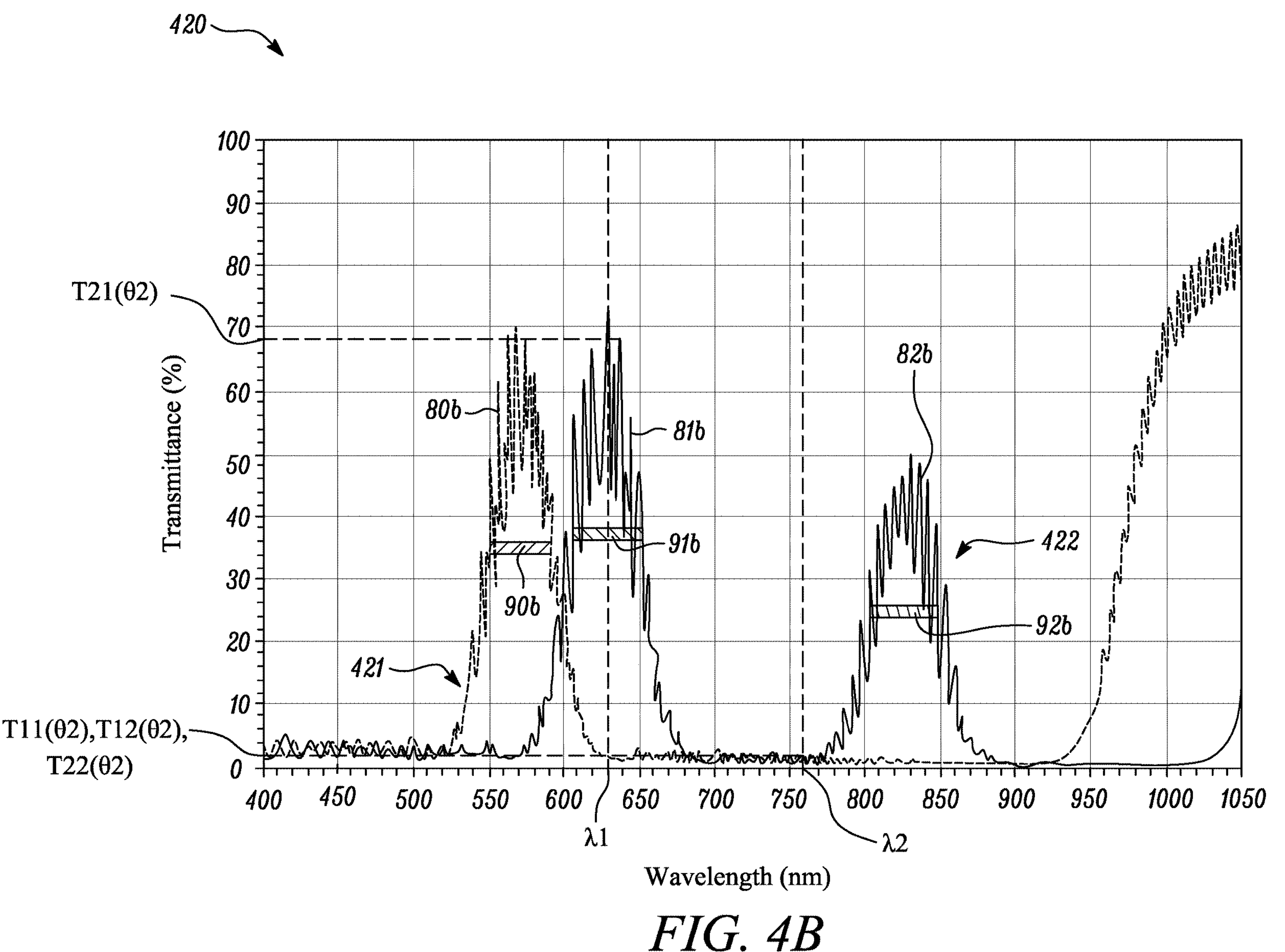
FIG. 4B illustrates a plot depicting respective optical transmittances versus wavelength of the first and second optical films for the incident light incident in the incident plane at a second incident angle, according to an embodiment of the present disclosure.

FIG. 4B illustrates a plot 420 depicting respective optical transmittances versus wavelength of the first and second optical films 10, 20 (shown in FIG. 1), for the incident light 42 (shown in FIG. 2) incident in the incident plane 43 (shown in FIG. 2) at the second incident angle θ2 (shown in FIG. 1), according to an embodiment of the present disclosure. Specifically, the plot 420 illustrates the optical transmittances versus wavelength of the first and second optical films 10, 20, respectively, for the at least one of the s- and p-polarized incident lights 42 incident in the incident plane 43 at the second incident angle θ2. Wavelength is expressed in nanometers (nm) in the abscissa. Optical transmittance is expressed as a transmittance percentage in the left ordinate axis.

Referring now to FIGS. 1, 2, 3A, and 4B, the plot 420 includes a curve 421 corresponding to the optical transmittance of the first optical film 10 for the at least one of the s- and p-polarized incident lights 42 incident in the incident plane 43 at the second incident angle θ2. The curve 421 may interchangeably be referred to as "the optical transmittance of the first optical film versus wavelength 421", "the optical transmittance versus wavelength 421", or "the optical transmittance of the plurality of microlayers versus wavelength 421" of the first optical film 10.

The plot 420 further includes a curve 422 corresponding to the optical transmittance of the second optical film 20 for the at least one of the s- and p-polarized incident lights 42 incident in the incident plane 43 at the second incident angle θ2. The curve 422 may interchangeably be referred to as "the optical transmittance of the second optical film versus wavelength 422", "the optical transmittance versus wavelength 422", or "the optical transmittance of the plurality of microlayers versus wavelength 422" of the second optical film 20.

For the at least one of the s- and p-polarized incident lights 42 incident in the incident plane 43, at the second incident angle θ2 different than the first incident angle θ1, and at the first and second wavelengths λ1, λ2, the first optical film 10 has respective optical transmittances T11(θ2) and T12(θ2), and the second optical film 20 has respective optical transmittances T21(θ2) and T22(θ2).

T21(θ2) is at least 5 times greater than each of T11(θ2), T12(θ2), and T22(θ2), i.e., T21(θ2)≥5 T11(θ2), T21(θ2)≥5 T12(θ2), and T21(θ2)≥5 T22(θ2). In some embodiments, T21(θ2) is at least 10 times, at least 15 times, at least 20 times, at least 30 times, at least 40 times, at least 50 times, at least 100 times, at least 250 times, or at least 500 times greater than each of T11(θ2), T12(θ2), and T22(θ2).

In the illustrated embodiment of FIG. 4B, for the at least one of the s- and p-polarized incident lights 42 incident in the incident plane 43, at the second incident angle θ2 of about 40 degrees, and at the first and second wavelengths λ1, λ2 of about 630 nm and about 760 nm, respectively, the first optical film 10 has respective optical transmittances T11(θ2) of about 2% and T12(θ2) of about 2%, and the second optical film 20 has respective optical transmittances T21(θ2) of about 68% and T22(θ2) of about 2%.

Therefore, as is apparent from the plot 420, for the first wavelength λ1, the second optical film 20 substantially transmits the at least one of the s- and p-polarized incident lights 42 incident in the incident plane 43 at the second incident angle θ2. Further, for the second wavelength λ2, the second optical film 20 substantially reflects the at least one of the s- and p-polarized incident lights 42 incident in the incident plane 43 at the second incident angle θ2. Furthermore, for each of the first and second wavelengths λ1, λ2, the first optical film 10 substantially reflects the at least one of the s- and p-polarized incident lights 42 incident in the incident plane 43 at the second incident angle θ2.

Generally, the first light 40 having the first wavelength λ1 is incident on the first optical film 10 at the second incident angle θ2 when the first light 40 from the at least one light source 70, 71 is reflected from the second optical film 20. Thus, the first light 40 reflected from the second optical film 20 is substantially reflected by the first optical film 10 and may be recycled within the recycling optical cavity 200 and/or may irradiate the test material 30.

Further, the first optical film 10 substantially reflects a portion of the second light 41 having the second wavelength λ2 that may be emitted towards the first optical film 10 and may be incident on the first optical film 10 at the second incident angle θ2.

Furthermore, the second optical film 20 substantially reflects a remaining portion of the second light 41 having the second wavelength λ2 incident on the second optical film 20 at the second incident angle θ2. Thus, the second light 41 having the second wavelength λ2 and incident at the second incident angle θ2 may be recycled in the recycling optical cavity 200.

Moreover, a portion of the first light 40 having the first wavelength λ1 and incident on the second optical film 20 at the second incident angle θ2 may be transmitted by the second optical film 20. The portion of the first light 40 having the first wavelength λ1 exiting from the recycling optical cavity 200 through the second optical film 20 may be detected by the first optical detector 60 and may be used as a reference optical intensity. In such a case, the second optical film 20 may act as a spectral as well as an angular filter, allowing only lights having a specific wavelength and incident at specific angles to exit the recycling optical cavity 200.

In some embodiments, for the at least one of the s- and p-polarized incident lights 42 incident in the incident plane 43, the optical transmittances of the first and second optically reflective walls versus wavelength 421, 422 includes first, second, and third transmittance bands 80*b*, 81*b*, 82*b* having corresponding and nonoverlapping FWHMs FWHM1 90*b*, FWHM2 91*b*, and FWHM3 92*b*. Specifically, in the illustrated embodiment of FIG. 4B, the FWHM1 of the first transmittance band 80*b* corresponds to FWHM 90*b*. The FWHM2 of the second transmittance band 81*b* corresponds to FWHM 91*b*. The FWHM3 of the third transmittance band 82*b* corresponds to FWHM 92*b*. At the second incident angle θ2 different than the first incident angle θ1, only FWHM2 91*b* includes the first wavelength λ1 and none of the three FWHMs FWHM1 90*b*, FWHM2 91*b*, FWHM3 92*b* includes the second wavelength λ2. In some embodiments, each of the FWHM1 90*b*, FWHM2 91*b*, and FWHM3 92*b* is greater than about 30 nm and less than about 300 nm. In some embodiments, each of the FWHM1 90*b*, FWHM2 91*b*, and FWHM3 92*b* is greater than about 35 nm, greater than about 40 nm, greater than about 45 nm, or greater than about 50 nm and less than about 250 nm, less than about 200 nm, or less than about 150 nm.

Figure 4C:
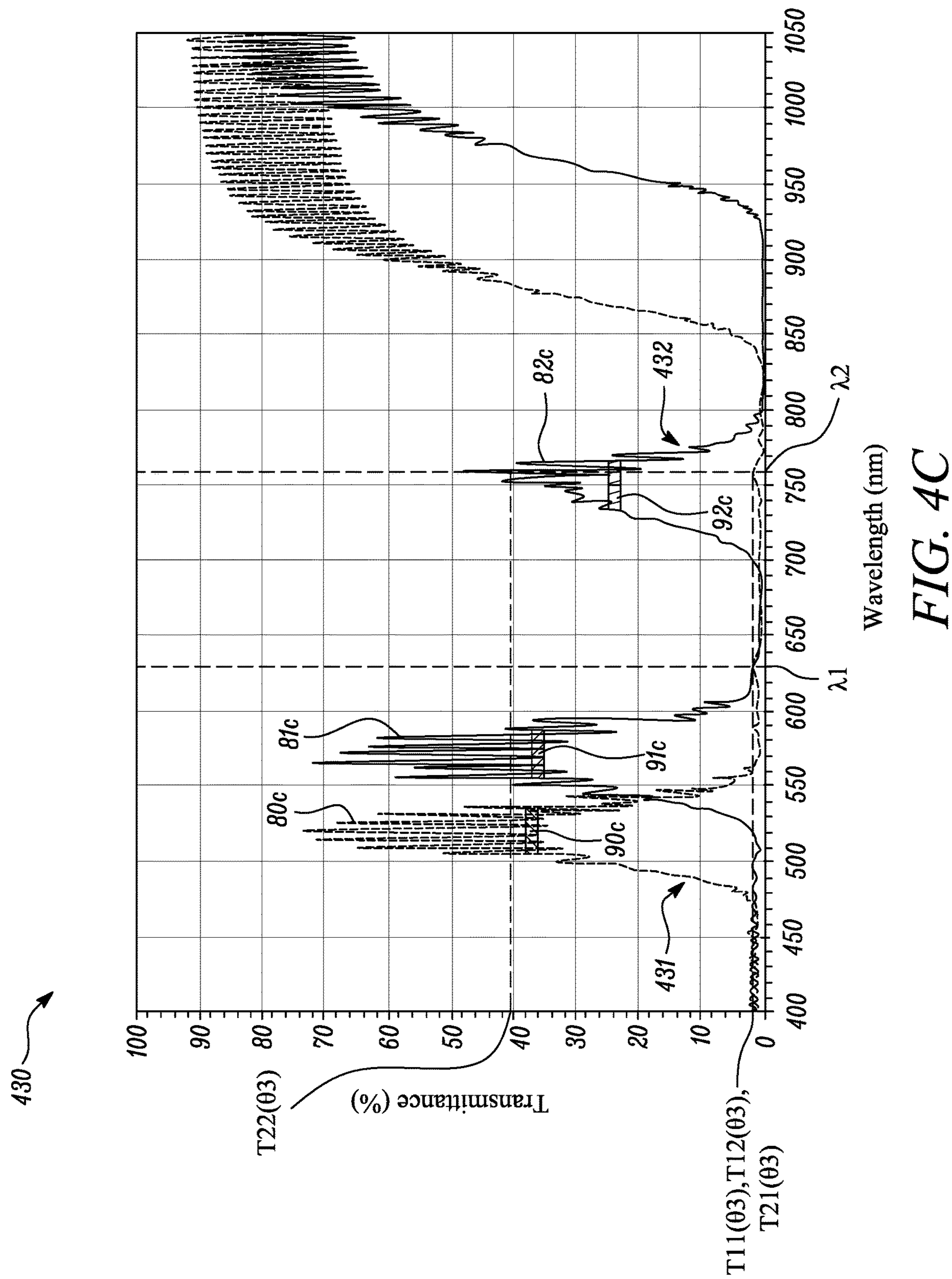
FIG. 4C illustrates a plot depicting respective optical transmittances versus wavelength of the first and second optical films for the incident light incident in the incident plane at a third incident angle, according to an embodiment of the present disclosure.

FIG. 4C illustrates a plot 430 depicting respective optical transmittances versus wavelength of the first and second optical films 10, 20 (shown in FIG. 1), for the incident light 42 (shown in FIG. 2) incident in the incident plane 43 (shown in FIG. 2) at the third incident angle θ3 (shown in FIG. 1), according to an embodiment of the present disclosure. Specifically, the plot 430 illustrates the optical transmittances versus wavelength of the first and second optical films 10, 20, respectively, for the at least one of the s- and p-polarized incident lights 42 incident in the incident plane 43 at the third incident angle θ3. Wavelength is expressed in nanometers (nm) in the abscissa. Optical transmittance is expressed as a transmittance percentage in the left ordinate axis.

Referring now to FIGS. 1, 2, 3A, and 4C, the plot 430 includes a curve 431 corresponding to the optical transmittance of the first optical film 10 for the at least one of the s- and p-polarized incident lights 42 incident in the incident plane 43 at the third incident angle θ3. The curve 431 may interchangeably be referred to as "the optical transmittance of the first optical film versus wavelength 431", "the optical transmittance versus wavelength 431", or "the optical transmittance of the plurality of microlayers versus wavelength 431" of the first optical film 10.

The plot 430 further includes a curve 432 corresponding to the optical transmittance of the second optical film 20 for the at least one of the s- and p-polarized incident lights 42 incident in the incident plane 43 at the third incident angle θ3. The curve 432 may interchangeably be referred to as "the optical transmittance of the second optical film versus wavelength 432", "the optical transmittance versus wavelength 432", or "the optical transmittance of the plurality of microlayers versus wavelength 432" of the second optical film 20.

For the at least one of the s- and p-polarized incident lights 42 incident in the incident plane 43, at the third incident angle θ3 different than the first and second incident angles θ1, θ2, and at the first and second wavelengths λ1, λ2, the first optical film 10 has respective optical transmittances T11(θ3) and T12(θ3), and the second optical film 20 has respective optical transmittances T21(θ3) and T22(θ3). T22(θ3) is at least 5 times greater than each of T11(θ3), T12(θ3), and T21(θ3), i.e., T22(θ3)≥5 T11(θ3), T22(θ3)≥5 T12(θ3), and T22(θ3)≥5 T21(θ3). In some embodiments, T22(θ3) is at least 10 times, at least 15 times, at least 20 times, at least 30 times, at least 40 times, at least 50 times, at least 100 times, at least 250 times, or at least 500 times greater than each of T11(θ3), T12(θ3), and T21(θ3).

In the illustrated embodiment of FIG. 4C, for the at least one of the s- and p-polarized incident lights 42 incident in the incident plane 43, at the third incident angle θ3 of about 60 degrees, and at the first and second wavelengths λ1, λ2 of about 630 nm and about 760 nm, respectively, the first optical film 10 has respective optical transmittances T11(θ3) of about 2% and T12(θ3) of about 2%, and the second optical film 20 has respective optical transmittances T21(θ3) of about 2% and T22(θ3) of about 40%.

Therefore, as is apparent from the plot 430, for the at least one of the s- and p-polarized incident lights 42 incident in the incident plane 43 at the third incident angle θ3, the second optical film 20 has a substantially greater optical transmittance at the second wavelength λ2 than the optical transmittance at the first wavelength λ1. Further, for the first wavelength λ1, the second optical film 20 substantially reflects the at least one of the s- and p-polarized incident lights 42 incident in the incident plane 43 at the third incident angle θ3. Furthermore, for each of the first and second wavelengths λ1, λ2, the first optical film 10 substantially reflects the at least one of the s- and p-polarized incident lights 42 incident in the incident plane 43 at the third incident angle θ3.

Generally, the first light 40 having the first wavelength λ1 is incident on the first optical film 10 at the third incident angle θ3 when the first light 40 from the at least one light source 70, 71 is reflected from the second optical film 20. Thus, the first light 40 reflected from the second optical film 20 is substantially reflected by the first optical film 10 and is recycled within the recycling optical cavity 200.

Further, the first optical film 10 substantially reflects the portion of the second light 41 having the second wavelength λ2 that may be emitted towards the first optical film 10 and may be incident on the first optical film 10 at the third incident angle θ3.

Furthermore, a portion of the first light 40 having the first wavelength λ1 and incident on the second optical film 20 at the third incident angle θ3 may be substantially reflected back towards the test material 30, thereby allowing the first light 40 having the first wavelength λ1 to be incident on the test material 30. Thus, the first light 40 having the first wavelength λ1 is recycled in the recycling optical cavity 200, thereby allowing a higher utilization of the first light 40 having the first wavelength λ1 by the test material 30.

Moreover, the second optical film 20 transmits a portion of the second light 41 having the second wavelength λ2 and incident on the second optical film 20 at the third incident angle θ3. The portion of the second light 41 having the second wavelength λ2 and incident at the third incident angle θ3 may exit from the recycling optical cavity 200 and may be detected by the second optical detector 61.

Thus, the first and second optical films 10, 20 may allow recycling within the recycling optical cavity 200 of the first light 40 having the first wavelength λ1 and entering the optical cavity 200 at the first incident angle θ1, thereby resulting in a higher utilization of the first light 40 having the first wavelength λ1 by the test material 30 disposed in the optical cavity 200. Further, the second light 41 having the second wavelength λ2 and emitted by the test material 30 is also recycled within the recycling optical cavity 200, thereby resulting in an increased optical intensity of the second light 41 having the second wavelength λ2 and exiting the recycling optical cavity 200 at the third incident angle θ3.

In some embodiments, for the at least one of the s- and p-polarized incident lights 42 incident in the incident plane 43, the optical transmittances of the first and second optically reflective walls versus wavelength 431, 432 includes first, second, and third transmittance bands 80*c*, 81*c*, 82*c* having corresponding and nonoverlapping FWHMs FWHM1 90*c*, FWHM2 91*c*, and FWHM3 92*c*. Specifically, in the illustrated embodiment of FIG. 4C, the FWHM1 of the first transmittance band 80*c* corresponds to FWHM 90*c*. The FWHM2 of the second transmittance band 81*c* corresponds to FWHM 91*c*. The FWHM3 of the third transmittance band 82*c* corresponds to FWHM 92*c*. At the third incident angle θ3 different than the first and second incident angles θ1, θ2, only FWHM3 92*c* includes the second wavelength λ2 and none of the three FWHMs FWHM1 90*c*, FWHM2 91*c*, FWHM3 92*c* includes the first wavelength λ1. In some embodiments, each of the FWHM1 90*c*, FWHM2 91*c*, and FWHM3 92*c* is greater than about 30 nm and less than about 300 nm. In some embodiments, each of the FWHM1 90*c*, FWHM2 91*c*, and FWHM3 92*c* is greater than about 35 nm, greater than about 40 nm, greater than about 45 nm, or greater than about 50 nm and less than about 250 nm, less than about 200 nm, or less than about 150 nm.

Referring now to FIGS. 1, 2, 4A-4C, in some embodiments, for the at least one of the s- and p-polarized incident lights 42 incident in the incident plane 43, for at least one of the first, second, and third incident angles θ1, θ2, θ3, and for a wavelength range of interest that includes the first and second wavelengths λ1, λ2 and is at least 400 nm wide, an optical transmittance of one of the first and second optical films versus wavelength includes only one transmittance band that has a corresponding FWHM of greater than about 30 nm, and an optical transmittance of the other one of the first and second optical films versus wavelength includes only two transmittance bands that have corresponding non-overlapping FWHM of greater than about 30 nm each.

In some embodiments, the wavelength range of interest that includes the first and second wavelengths λ1, λ2 is at least 450 nm, at least 500 nm, at least 550 nm, at least 600 nm, at least 650 nm, or at least 700 nm wide. In some embodiments, the FWHMs are greater than about 35 nm, greater than about 40 nm, greater than about 45 nm, or greater than about 50 nm.

Specifically, referring to the plots 410, 420, 430, in some embodiments, for the at least one of the s- and p-polarized incident lights 42 incident in the incident plane 43, for the at least one of the first, second, and third incident angles θ1, θ2, θ3, and for the wavelength range of interest that includes the first and second wavelengths λ1, λ2 and is at least 400 nm wide, the optical transmittance of the first optical film versus wavelength 411, 421, 431 includes only one transmittance band 80, 80*b*, 80*c* that has the corresponding FWHM 90, 90*b*, 90*c* of greater than about 30 nm. In some embodiments, for the at least one of the s- and p-polarized incident lights 42 incident in the incident plane 43, for the at least one of the first, second, and third incident angles θ1, θ2, θ3, and for the wavelength range of interest that includes the first and second wavelengths λ1, λ2 and is at least 400 nm wide, the optical transmittance of the second optical film versus wavelength 412, 422, 432 includes two transmittance bands 81, 82, 81*b*, 82*b*, 81*c*, 82*c*, respectively, that have the corresponding non-overlapping FWHM 91, 92, 91*b*, 92*b*, 91*c*, 92*c*, of greater than about 30 nm each. Specifically, each of the optical transmittances of the first optical film versus wavelengths 411, 421, 431 includes the only one corresponding transmittance band 80, 80*b*, 80*c* that has the corresponding non-overlapping FWHM 90, 90*b*, 90*c* of greater than about 30 nm. Further, the optical transmittance of the second optical film versus wavelength 412 includes two transmittance bands 81, 82 that have the corresponding non-overlapping FWHMs 91, 92 of greater than about 30 nm each. The optical transmittance of the second optical film versus wavelength 422 includes two transmittance bands 81*b*, 82*b* that have the corresponding non-overlapping FWHMs 91*b*, 92*b* of greater than about 30 nm each. The optical transmittance of the second optical film versus wavelength 432 includes two transmittance bands 81*c*, 82*c* that have the corresponding non-overlapping FWHMs 91*c*, 92*c* of greater than about 30 nm each.

For the at least one of the s- and p-polarized incident lights 42 incident in the incident plane 43 with the incident angle θ of less than about 75 degrees, the optical transmittances of the first and second optical films versus wavelength 411, 421, 431, 412, 422, 432 include respective first and second transmission bands 80, 81, 80*b*, 81*b*, 80*c*, 81*c* having respective first and second FWHMs 90, 91, 90*b*, 91*b*, 90*c*, 91*c* having respective widths W1 and W2. Specifically, in some embodiments, for the at least one of the s- and p-polarized incident lights 42 incident in the incident plane 43 with the incident angle θ of less than about 75 degrees, the optical transmittances of the first optical film versus wavelength 411, 421, 431 includes the first transmission bands 80, 80*b*, 80*c* having respective first FWHMs 90, 90*b*, 90*c* having width W1. Further, in some embodiments, for the at least one of the s- and p-polarized incident lights 42 incident in the incident plane 43 with the incident angle θ of less than about 75 degrees, the optical transmittances of the second optical film versus wavelength 412, 422, 432 includes the first transmission bands 81, 81*b*, 81*c* having respective second FWHMs 91, 91*b*, 91*c* having width W2.

In some embodiments, for the at least one of the s- and p-polarized incident lights 42 incident in the incident plane 43 with the incident angle θ of less than about 65 degrees, less than about 55 degrees, less than about 45 degrees, less than about 35 degrees, less than about 25 degrees, less than about 15 degrees, or less than about 5 degrees, the optical transmittances of the first and second optical films versus wavelength 411, 421, 431, 412, 422, 432 include the respective first and second transmission bands 80, 81, 80*b*, 81*b*,

80*c*, 81*c* having the respective first and second FWHM 90, 91, 90*b*, 91*b*, 90*c*, 91*c* having the respective widths W1 and W2.

Each of W1 and W2 is greater than about 30 nm and less than about 300 nm, such that any wavelength overlap between the first and second FWHMs 90, 91, 90*b*, 91*b*, 90*c*, 91*c* is less than about 50% of a lesser of W1 and W2. Specifically, the any wavelength overlap between the first FWHM 90 and the second FWHM 91 of the optical transmittance of the first optical film versus wavelength 411 is less than about 50% of the lesser of W1 and W2. The any wavelength overlap between the first FWHM 90*b* and the second FWHM 91*b* of the optical transmittance of the first optical film versus wavelength 421 is less than about 50% of the lesser of W1 and W2. The any wavelength overlap between the first FWHM 90*c* and the second FWHM 91*c* of the optical transmittance of the first optical film versus wavelength 431 is less than about 50% of the lesser of W1 and W2.

In some embodiments, each of the W1 and W2 is greater than about 35 nm, greater than about 40 nm, greater than about 45 nm, or greater than about 50 nm and less than about 250 nm, less than about 200 nm, or less than about 150 nm.

In some embodiments, there is no overlap between the first and second FWHM 90, 91, 90*b*, 91*b*, 90*c*, 91*c* and the first and second FWHM 90, 91, 90*b*, 91*b*, 90*c*, 91*c* are within about 100 nm of each other. Specifically, in some embodiments, for the optical transmittance of the first optical film versus wavelength 411, there is no overlap between the first FWHM 90 and the second FWHM 91 and the first FWHM 90 and the second FWHM 91 are within about 100 nm of each other. Further, in some embodiments, for the optical transmittance of the first optical film versus wavelength 421, there is no overlap between the first FWHM 90*b* and the second FWHM 91*b* and the first FWHM 90'*b* and the second FWHM 91*b* are within about 100 nm of each other. Furthermore, in some embodiments, for the optical transmittance of the first optical film versus wavelength 431, there is no overlap between the first FWHM 90*c* and the second FWHM 91*c* and the first FWHM 90*c* and the second FWHM 91*c* are within about 100 nm of each other.

In some embodiments, there is no overlap between the first and second FWHM 90, 91, 90*b*, 91*b*, and the first and second FWHM 90, 91, 90*b*, 91*b* are within about 80 nm, within about 60 nm, within about 50 nm, within about 40 nm, within about 30 nm, or within about 20 nm of each other.

Figure 5A:
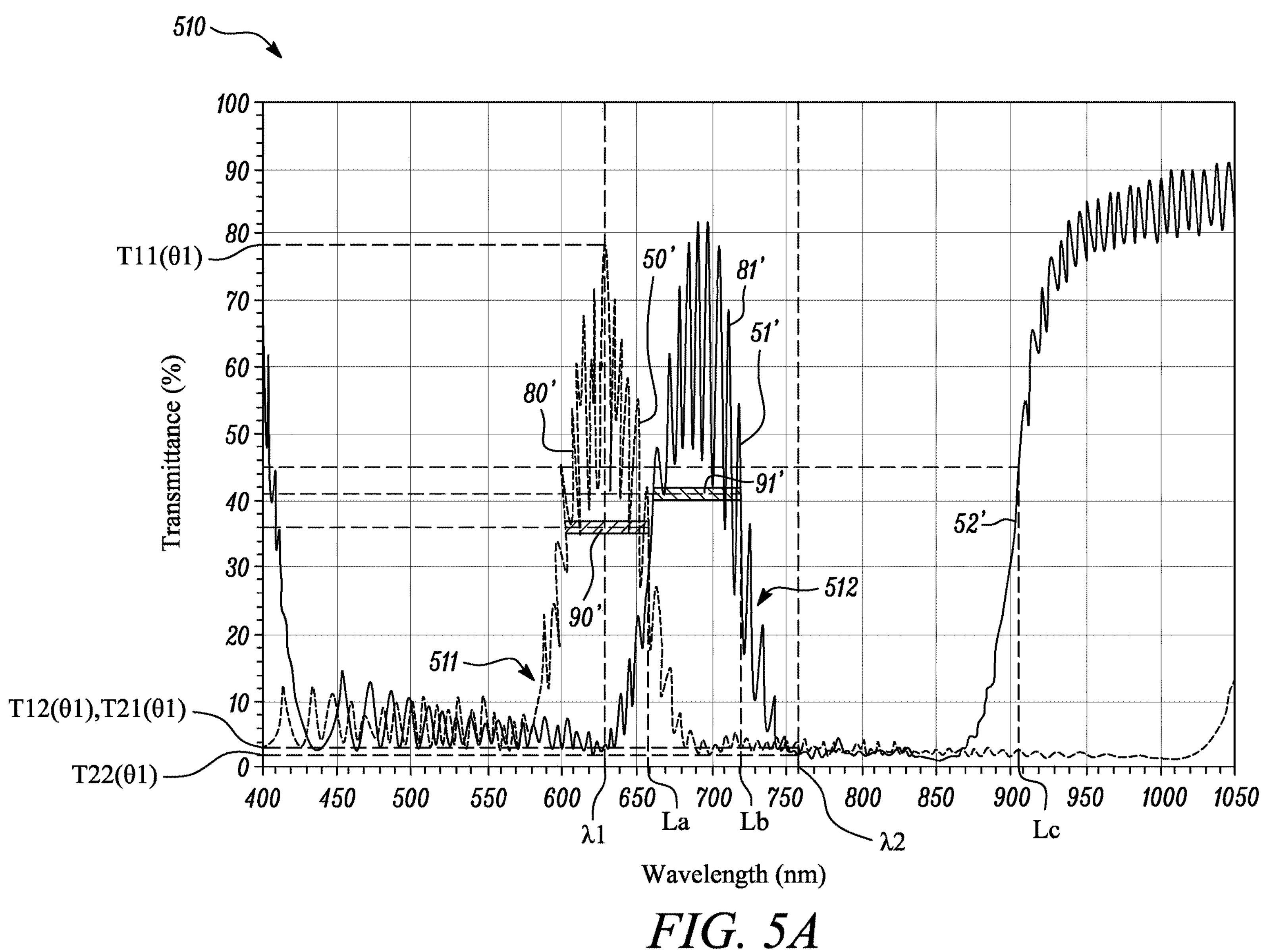
FIG. 5A illustrates a plot depicting respective optical transmittances versus wavelength of the first and second optical films for the incident light incident in the incident plane at the first incident angle, according to another embodiment of the present disclosure.

FIG. 5A illustrates a plot 510 depicting respective optical transmittances versus wavelength of the first and second optical films 10, 20 (shown in FIG. 1), for the incident light 42 (shown in FIG. 2) incident in the incident plane 43 (shown in FIG. 2) at the first incident angle θ1 (shown in FIG. 1), according to another embodiment of the present disclosure. Specifically, the plot 510 illustrates the optical transmittances versus wavelength of the first and second optical films 10, 20, respectively, for the at least one of the s- and p-polarized incident lights 42 incident in the incident plane 43 at the first incident angle θ1. Wavelength is expressed in nanometers (nm) in the abscissa. Optical transmittance is expressed as a transmittance percentage in the left ordinate axis.

Referring now to FIGS. 1, 2, 3B, and 5A, the plot 510 includes a curve 511 corresponding to the optical transmittance of the first optical film 10 for the at least one of the s- and p-polarized incident lights 42 incident in the incident plane 43 at the first incident angle θ1. The curve 511 may interchangeably be referred to as "the optical transmittance of the first optical film versus wavelength 511", "the optical transmittance versus wavelength 511", or "the optical transmittance of the plurality of microlayers versus wavelength 511" of the first optical film 10.

The plot 510 further includes a curve 512 corresponding to the optical transmittance of the second optical film 20 for the at least one of the s- and p-polarized incident lights 42 incident in the incident plane 43 at the first incident angle θ1. The curve 512 may interchangeably be referred to as "the optical transmittance of the second optical film versus wavelength 512", "the optical transmittance versus wavelength 512", or "the optical transmittance of the plurality of microlayers versus wavelength 512" of the second optical film 20.

For the at least one of the s- and p-polarized incident lights 42 incident in the incident plane 43, at the first incident angle θ1 of about 0 degree, and at the first and second wavelengths λ1, λ2 of about 630 nm and about 760 nm, respectively, the first optical film 10 has respective optical transmittances T11(θ1) of about 77% and T12(θ1) of about 3% and the second optical film 20 has respective optical transmittances T21(θ1) of about 3% and T22(θ1) of about 2%.

In some embodiments, for the at least one of the s- and p-polarized incident lights 42 incident in the incident plane 43 at the first incident angle θ1, the optical transmittance of the plurality of microlayers versus wavelength 511 for the first optically reflective wall 10 includes a first band edge 50' along which the transmittance generally decreases with increasing wavelength. The first band edge 50 has a midpoint at the wavelength La. The midpoint of the first band edge 50' may correspond to the half of a peak value of optical transmittance of the first band edge 50'.

In some embodiments, for the at least one of the s- and p-polarized incident lights 42 incident in the incident plane 43 at the first incident angle θ1, the optical transmittance of the plurality of microlayers versus wavelength 512 for the second optically reflective wall 20 includes second and third band edges 51', 52' with the transmittance generally decreasing with increasing wavelength along the second band edge 51' and generally increasing with increasing wavelength along the third band edge 52'. The second and third band edges 51', 52' have midpoints at respective wavelengths Lb and Lc. The midpoint of the second band edge 51' may correspond to the half of a peak value of optical transmittance of the second band edge 51'. Similarly, the midpoint of the third band edge 52' may correspond to the half of a peak value of optical transmittance of the third band edge 52'. Further, as is apparent from the plot 510, L1<La<Lb<Lc. In the illustrated embodiment of FIG. 5A, L1 is equivalent to the first wavelength λ1 of about 630 nm, La is about 660 nm, Lb is about 720 nm, and Lc is about 910 nm.

In some embodiments, for the at least one of the s- and p-polarized incident lights 42 incident in the incident plane 43 at the first incident angle θ1, the optical transmittances at the midpoints of the first, second, and third band edges 50', 51', 52' are between about 20% and about 60%. In some embodiments, for the at least one of the s- and p-polarized incident lights 42 incident in the incident plane 43 at the first incident angle θ1, the optical transmittances at the midpoints of the first, second, and third band edges 50', 51', 52' are between about 25% and about 55%, or between about 30% and about 50%. In the illustrated embodiment of FIG. 5A, for the at least one of the s- and p-polarized incident lights 42 incident in the incident plane 43 at the first incident angle θ1, the optical transmittances at the midpoints of the first, second and third band edges 50', 51', 52' are about 36%, about 41%, and about 45%, respectively.

In some embodiments, the first band edge 50' is a right band edge of a transmission band 80' of the first optically reflective wall 10. The transmission band 80' has a corresponding FWHM 90' of greater than about 30 nm and less than about 300 nm. In the illustrated embodiment of FIG. 5A, the FWHM 90' is about 60 nm.

In some embodiments, the second band edge 51' is a right band edge of a transmission band 81' of the second optically reflective wall 20. The transmission band 81' has a corresponding FWHM 91' of greater than about 30 nm and less than about 300 nm. In the illustrated embodiment of FIG. 5A, the FWHM 91' is about 60 nm.

In some embodiments, the FWHMs of the first, and second transmission bands 80', 81' may be referred to as FWHM1 and FWHM2, respectively. Therefore, the FWHM 90' may be interchangeably referred to as "the FWHM1 90'", and the FWHM 91' may be interchangeably referred to as "the FWHM2 91'".

In some embodiments, for the at least one of the s- and p-polarized incident lights 42 incident in the incident plane 43, the optical transmittances of the first and second optically reflective walls versus wavelength 511, 512 may include the first and second transmittance bands 80', 81' having corresponding and nonoverlapping FWHMs FWHM1 90' and FWHM2 91'. Specifically, in the illustrated embodiment of FIG. 5A, the FWHM1 of the first transmittance band 80' corresponds to FWHM 90'. The FWHM2 of the second transmittance band 81' corresponds to FWHM 91'. At the first incident angle θ1, only FWHM1 90' may include the first wavelength λ1 and none of the FWHMs FWHM 90', FWHM 91' may include the second wavelength λ2. In some embodiments, each of the FWHM1 90' and FWHM2 91' is greater than about 30 nm and less than about 300 nm. In some embodiments, each of the FWHM1 90' and FWHM2 91' is greater than about 35 nm, greater than about 40 nm, greater than about 45 nm, or greater than about 50 nm and less than about 250 nm, less than about 200 nm, or less than about 150 nm.

Figure 5B:
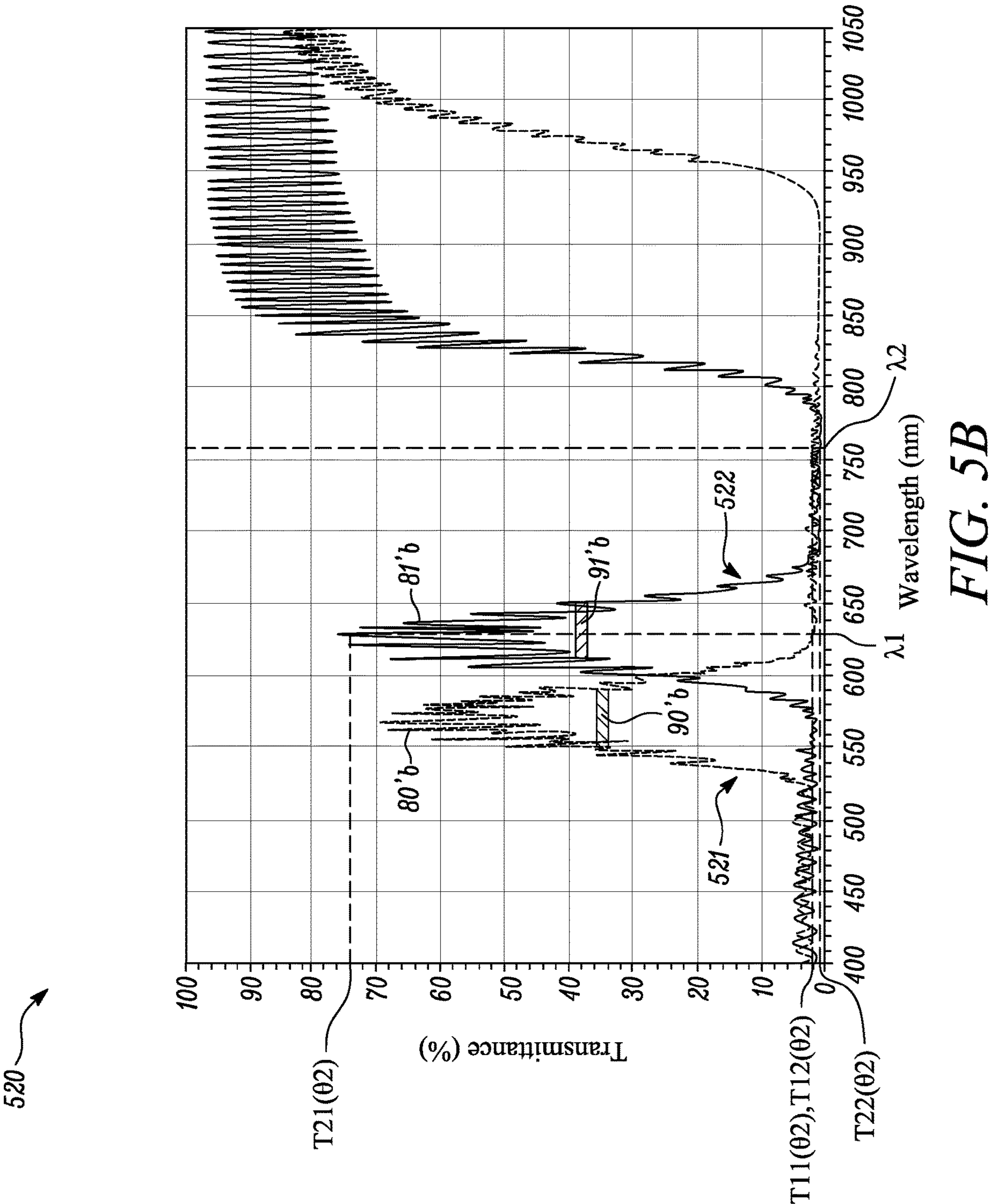
FIG. 5B illustrates a plot depicting respective optical transmittances versus wavelength of the first and second optical films for the incident light incident in the incident plane at the second incident angle, according to another embodiment of the present disclosure.

FIG. 5B illustrates a plot 520 depicting respective optical transmittances versus wavelength of the first and second optical films 10, 20 (shown in FIG. 1), for the incident light 42 (shown in FIG. 2) incident in the incident plane 43 (shown in FIG. 2) at the second incident angle θ2 (shown in FIG. 1), according to another embodiment of the present disclosure. Specifically, the plot 520 illustrates the optical transmittances versus wavelength of the first and second optical films 10, 20, respectively, for the at least one of the s- and p-polarized incident lights 42 incident in the incident plane 43 at the second incident angle θ2. Wavelength is expressed in nanometers (nm) in the abscissa. Optical transmittance is expressed as a transmittance percentage in the left ordinate axis.

Referring now to FIGS. 1, 2, 3B, and 5B, the plot 520 includes a curve 521 corresponding to the optical transmittance of the first optical film 10 for the at least one of the s- and p-polarized incident lights 42 incident in the incident plane 43 at the second incident angle θ2. The curve 521 may interchangeably be referred to as "the optical transmittance of the first optical film versus wavelength 521", "the optical transmittance versus wavelength 521", or "the optical transmittance of the plurality of microlayers versus wavelength 521" of the first optical film 10.

The plot 520 further includes a curve 522 corresponding to the optical transmittance of the second optical film 20 for the at least one of the s- and p-polarized incident lights 42 incident in the incident plane 43 at the second incident angle θ2. The curve 522 may interchangeably be referred to as "the optical transmittance of the second optical film versus wavelength 522", "the optical transmittance versus wavelength 522", or "the optical transmittance of the plurality of microlayers versus wavelength 522" of the second optical film 20.

In some embodiments, for the at least one of the s- and p-polarized incident lights 42 incident in the incident plane 43, at the second incident angle θ2 of about 40 degrees, and at the first and second wavelengths λ1, λ2 of about 630 nm and about 760 nm, respectively, the first optical film 10 has respective optical transmittances T11(θ2) of about 2% and T12(θ2) of about 2% and the second optical film 20 has respective optical transmittances T21(θ2) of about 74% and T22(θ2) of about 1%.

In some embodiments, for the at least one of the s- and p-polarized incident lights 42 incident in the incident plane 43, the optical transmittances of the first and second optically reflective walls versus wavelength 521, 522 may include first and second transmittance bands **80'*b*, 81'*b* having corresponding and nonoverlapping FWHMs FWHM1 90'*b*, FWHM2 91'*b*. Specifically, in the illustrated embodiment of FIG. 5B, the FWHM1 of the first transmittance band 80'*b* corresponds to FWHM 90'*b*. The FWHM2 of the second transmittance band 91'*b* corresponds to FWHM 91'*b*. At the second incident angle θ2 different than the first incident angle θ1, only FWHM2 91'*b* may include the first wavelength λ1 and none of the FWHMs FWHM 90'*b*, FWHM 91'*b* may include the second wavelength λ2. In some embodiments, each of the FWHM1 90'*b* and FWHM2 91'*b* is greater than about 30 nm and less than about 300 nm. In some embodiments, each of the FWHM1 90'*b* and FWHM2 91'*b*** is greater than about 35 nm, greater than about 40 nm, greater than about 45 nm, or greater than about 50 nm and less than about 250 nm, less than about 200 nm, or less than about 150 nm.

Figure 5C:
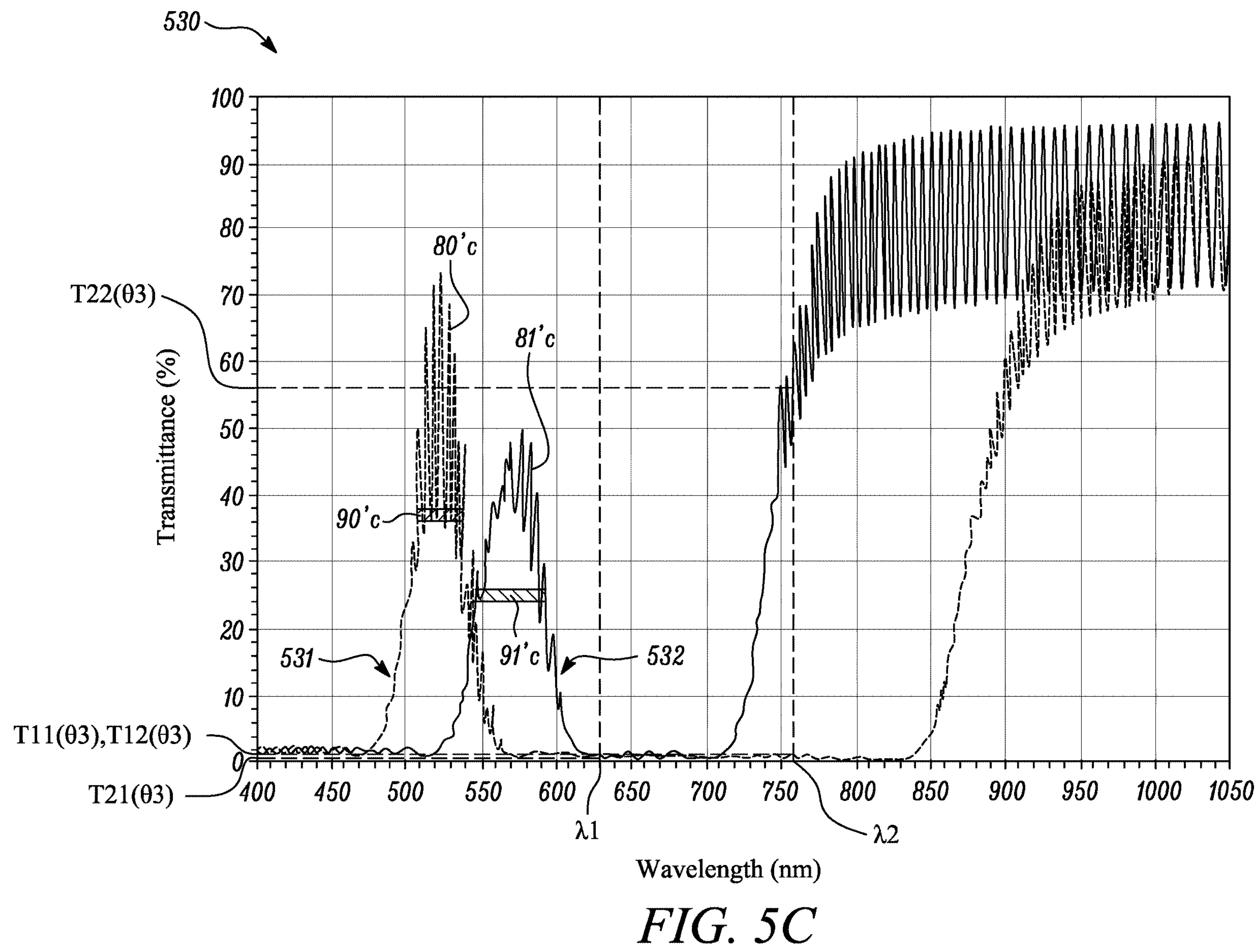
FIG. 5C illustrates a plot depicting respective optical transmittances versus wavelength of the first and second optical films for the incident light incident in the incident plane at the third incident angle, according to another embodiment of the present disclosure.

FIG. 5C illustrates a plot 530 depicting respective optical transmittances versus wavelength of the first and second optical films 10, 20 (shown in FIG. 1), for the incident light 42 (shown in FIG. 2) incident in the incident plane 43 (shown in FIG. 2) at the third incident angle θ3 (shown in FIG. 1), according to another embodiment of the present disclosure. Specifically, the plot 530 illustrates the optical transmittances versus wavelength of the first and second optical films 10, 20, respectively, for the at least one of the s- and p-polarized incident lights 42 incident in the incident plane 43 at the third incident angle θ3. Wavelength is expressed in nanometers (nm) in the abscissa. Optical transmittance is expressed as a transmittance percentage in the left ordinate axis.

Referring now to FIGS. 1, 2, 3B, and 5C, the plot 530 includes a curve 531 corresponding to the optical transmittance of the first optical film 10 for the at least one of the s- and p-polarized incident lights 42 incident in the incident plane 43 at the third incident angle θ3. The curve 531 may interchangeably be referred to as "the optical transmittance of the first optical film versus wavelength 531", "the optical transmittance versus wavelength 531", or "the optical transmittance of the plurality of microlayers versus wavelength 531" of the first optical film 10.

The plot 530 further includes a curve 532 corresponding to the optical transmittance of the second optical film 20 for the at least one of the s- and p-polarized incident lights 42 incident in the incident plane 43 at the third incident angle θ3. The curve 532 may interchangeably be referred to as "the optical transmittance of the second optical film versus wavelength 532", "the optical transmittance versus wavelength 532", or "the optical transmittance of the plurality of microlayers versus wavelength 532" of the second optical film 20.

In some embodiments, for the at least one of the s- and p-polarized incident lights 42 incident in the incident plane 43, at the third incident angle θ3 of about 60 degrees, and at the first and second wavelengths λ1, λ2 of about 630 nm and about 760 nm, respectively, the first optical film 10 has respective optical transmittances T11(θ3) of about 1% and T12(θ3) of about 1% and the second optical film 20 has respective optical transmittances T21(θ3) less than about 1% and T22(θ3) of about 56%.

In some embodiments, for the at least one of the s- and p-polarized incident lights 42 incident in the incident plane 43, the optical transmittances of the first and second optically reflective walls versus wavelength 531, 532 includes first and second transmittance bands 80'*c*, 81'*c* having corresponding and nonoverlapping FWHM1 90'*c*, FWHM2 91'*c*. Specifically, in the illustrated embodiment of FIG. 5C, the FWHM1 of the first transmittance band 80'*c* corresponds to FWHM 90'*c*. The FWHM2 of the second transmittance band 81'*c* corresponds to FWHM 91'*c*. At the third incident angle θ3 different than the first and second incident angles θ1, θ2, none of the FWHMs FWHM 90'*c*, FWHM 91'*c* includes the first wavelength λ1 or the second wavelength λ2. In some embodiments, each of the FWHM1 90'*c* and FWHM2 91'*c* is greater than about 30 nm and less than about 300 nm. In some embodiments, each of the FWHM1 90'*c* and FWHM2 91'*c* is greater than about 35 nm, greater than about 40 nm, greater than about 45 nm, or greater than about 50 nm and less than about 250 nm, less than about 200 nm, or less than about 150 nm.

Referring now to FIGS. 1, 2, 5A-5C, in some embodiments, for the at least one of the s- and p-polarized incident lights 42 incident in the incident plane 43, for at least one of the first, second, and third incident angles θ1, θ2, θ3, and for the wavelength range of interest that includes the first and second wavelengths λ1, λ2 and is at least 400 nm wide, the optical transmittance of each of the first and second optical films versus wavelength includes only one transmittance band. Each of the transmittance bands has a corresponding FWHM of greater than about 30 nm. In some embodiments, each of the transmittance bands has a corresponding FWHM of greater than about 35 nm, greater than about 40 nm, greater than about 45 nm, or greater than about 50 nm.

Specifically, referring to the plots 510, 520, 530, in some embodiments, for the at least one of the s- and p-polarized incident lights 42 incident in the incident plane 43, for the at least one of the first, second, and third incident angles θ1, θ2, θ3, and for the wavelength range of interest that includes the first and second wavelengths λ1, λ2 and is at least 400 nm wide, the optical transmittance of the first optical film versus wavelength 511, 521, 531 includes only one transmittance band 80', 80'*b*, 80'*c* that has the corresponding FWHM 90', 90'*b*, 90'*c* of greater than about 30 nm. In some embodiments, for the at least one of the s- and p-polarized incident lights 42 incident in the incident plane 43, for the at least one of the first, second, and third incident angles θ1, θ2, θ3, and for the wavelength range of interest that includes the first and second wavelengths λ1, λ2 and is at least 400 nm wide, the optical transmittance of the second optical film versus wavelength 512, 522, 532 includes only one transmittance band 81', 81'*b*, 81'*c* that has corresponding non-overlapping FWHM 91', 91'*b*, 91'*c* of greater than about 30 nm each.

Specifically, each of the optical transmittances of the first optical film versus wavelengths 511, 521, 531 includes the only one corresponding transmittance band 80', 80'*b*, 80'*c* that has the corresponding non-overlapping FWHMs 90', 90'*b*, 90'*c* of greater than about 30 nm. Further, each of the optical transmittances of the second optical film versus wavelengths 512, 522, 532 includes the only one corresponding transmittance band 81', 81'*b*, 81'*c* that has corresponding non-overlapping FWHMs 91', 91'*b*, 91'*c* of greater than about 30 nm each.

In some embodiments, for the at least one of the s- and p-polarized incident lights 42 incident in the incident plane 43 with the incident angle θ of less than about 75 degrees, the optical transmittances of the first and second optical films versus wavelength 511, 521, 531, 512, 522, 532 include respective first and second transmission bands 80', 81', 80'*b*, 81'*b*, 80'*c*, 81'*c* having respective first and second FWHMs 90', 91', 90'*b*, 91'*b*, 90'*c*, 91'*c* having respective widths W1 and W2.

Specifically, in some embodiments, for the at least one of the s- and p-polarized incident lights 42 incident in the incident plane 43 with the incident angle θ of less than about 75 degrees, the optical transmittances of the first optical film versus wavelength 511, 521, 531 includes the first transmission bands 80', 80'*b*, 80'*c* having respective first FWHMs 90', 90'*b*, 90'*c* having width W1. Further, for the at least one of the s- and p-polarized incident lights 42 incident in the incident plane 43 with the incident angle θ of less than about 75 degrees, the optical transmittances of the second optical film versus wavelength 512, 452, 532 includes the first transmission bands 81', 81'*b*, 81'*c* having respective second FWHMs 91', 91'*b*, 91'*c* having width W2.

In some embodiments, for the at least one of the s- and p-polarized incident lights 42 incident in the incident plane 43 with the incident angle θ of less than about 65 degrees, less than about 55 degrees, less than about 45 degrees, less than about 35 degrees, less than about 25 degrees, less than about 15 degrees, or less than about 5 degrees, the optical transmittances of the first and second optical films versus wavelength 511, 521, 531, 512, 522, 532 include the respective first and second transmission bands 80', 81', 80'*b*, 81'*b*, 80'*c*, 81'*c* having the respective first and second FWHM 90', 91', 90'*b*, 91'*b*, 90'*c*, 91'*c* having respective widths W1 and W2.

In some embodiments, each of W1 and W2 is greater than about 30 nm and less than about 300 nm, such that any wavelength overlap between the first and second FWHM 90', 91', 90'*b*, 91'*b*, 90'*c*, 91'*c* may be less than about 50% of a lesser of W1 and W2. In some embodiments, there is no overlap between the first and second FWHM 90', 91', 90'*b*, 91'*b*, 90'*c*, 91'*c* and the first and second FWHM 90', 91', 90'*b*, 91'*b*, 90'*c*, 91'*c* are within about 100 nm of each other.

Specifically, in some embodiments, the any wavelength overlap between the first FWHM 90' and the second FWHM 91' of the optical transmittance of the first optical film versus wavelength 511 is less than about 50% of the lesser of W1 and W2. In some embodiments, the any wavelength overlap between the first FWHM 90'*b* and the second FWHM 91'*b* of the optical transmittance of the first optical film versus wavelength 521 is less than about 50% of the lesser of W1 and W2. In some embodiments, the any wavelength overlap between the first FWHM 90'*c* and the second FWHM 91'*c* of the optical transmittance of the first optical film versus wavelength 531 is less than about 50% of the lesser of W1 and W2.

In some embodiments, there is no overlap between the first and second FWHMs 90', 91', 90'*b*, 91'*b*, 90'*c*, 91'*c* and the first and second FWHMs 90', 91', 90'b, 91'b, 90'c, 91'c are within about 100 nm of each other. Specifically, in some embodiments, for the optical transmittance of the first optical film versus wavelength 511, there is no overlap between the first FWHM 90' and the second FWHM 91' and the first FWHM 90' and the second FWHM 91' are within about 100 nm of each other. Further, in some embodiments, for the optical transmittance of the first optical film versus wavelength 521, there is no overlap between the first FWHM 90'b and the second FWHM 91'b and the first FWHM 90'b and the second FWHM 91'b are within about 100 nm of each other. Furthermore, in some embodiments, for the optical transmittance of the first optical film versus wavelength 531, there is no overlap between the first FWHM 90'c and the second FWHM 91'c and the first FWHM 90'c and the second FWHM 91'c are within about 100 nm of each other.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A recycling optical cavity defined at least by first and second optical films and configured to receive a test material therein, the test material configured to emit at least a second light having a second wavelength when irradiated with a first light having a different first wavelength, each of the first and second optical films comprising a plurality of polymeric microlayers numbering at least 10 in total, each of the polymeric microlayers having an average thickness of less than about 500 nm, such that for at least one of s- and p-polarized incident lights incident in an incident plane:

- at a first incident angle, and at the first and second wavelengths, the first optical film has respective optical transmittances T11(θ1) and T12(θ1), and the second optical film has respective optical transmittances T21 (θ1) and T22(θ1), T11(θ1) at least 5 times greater than each of T12(θ1), T21(θ1), and T22(θ1);
- at a second incident angle different than the first incident angle, and at the first and second wavelengths, the first optical film has respective optical transmittances Ti11 (θ2) and T12(θ2), and the second optical film has respective optical transmittances T21(θ2) and T22(θ2), T21(θ2) at least 5 times greater than each of T11(θ2), T12(θ2) and T22(θ2); and
- at a third incident angle different than the first and second incident angles, and at the first and second wavelengths, the first optical film has respective optical transmittances T11(θ3) and T12(θ3), and the second optical film has respective optical transmittances T21 (θ3) and T22(θ3), T22(θ3) at least 5 times greater than each of T11(θ3), T12(θ3), and T21(θ3).

2. The recycling optical cavity of claim 1, wherein the first wavelength is a visible wavelength in a visible wavelength range from about 300 nm to about 700 nm, and the second wavelength is an infrared wavelength in an infrared wavelength range from about 700 nm to about 1100 nm.

3. The recycling optical cavity of claim 1, wherein the third incident angle is greater than the second incident angle and the second incident angle is greater than the first incident angle.

4. The recycling optical cavity of claim 1, wherein a plot of an average layer thickness versus a layer number of the plurality of polymeric microlayers of each of the first and second optical films comprises at least two linear portions connected by at least one step portion, each of the at least two linear portions extending across at least 50 of the polymeric microlayers.

5. The recycling optical cavity of claim 4, wherein the plot of the average layer thickness versus the layer number of the plurality of polymeric microlayers of one of the first and second optical films comprises only two linear portions connected by one step portion, and the plot of the average layer thickness versus the layer number of the plurality of polymeric microlayers of the other one of the first and second optical films comprises only three linear portions connected by two step portions.

6. The recycling optical cavity of claim 1, wherein for the at least one of s- and p-polarized incident lights incident in the incident plane, for at least one of the first, second, and third incident angles, and for a wavelength range of interest that comprises the first and second wavelengths and is at least 400 nm wide, an optical transmittance of one of the first and second optical films versus wavelength comprises only one transmittance band that has a corresponding full width at half maximum of greater than about 30 nm, and an optical transmittance of the other one of the first and second optical films versus wavelength comprises only two transmittance bands that have corresponding non-overlapping full width at half maxima of greater than about 30 nm each.

7. The recycling optical cavity of claim 1, wherein the polymeric microlayers of the first and second optical films number N1 and N2 in total, respectively, a magnitude of a difference between N1 and N2 greater than about 50.

8. The recycling optical cavity of claim 1, wherein for the at least one of s- and p-polarized incident lights incident in the incident plane, for at least one of the first, second, and third incident angles, and for a wavelength range of interest that comprises the first and second wavelengths and is at least 400 nm wide, an optical transmittance of each of the first and second optical films versus wavelength comprises only one transmittance band, each of the transmittance bands having a corresponding full width at half maximum of greater than about 30 nm.

9. An optical system for sensing a test material, the optical system comprising:

- a recycling optical cavity comprising at least first and second optically reflective walls, at least a portion of each of the first and second optically reflective walls comprising a plurality of microlayers numbering at least 10 in total, each of the microlayers having an average thickness of less than about 500 nm; and
- a test material disposed in the recycling optical cavity and configured to emit at least a second light having a second wavelength L2 when irradiated with a first light having a different first wavelength L1, such that for at least one of s- and p-polarized incident lights incident in an incident plane at a same first incident angle, an optical transmittance of the plurality of microlayers versus wavelength:

for the first optically reflective wall, comprises a first band edge along which the transmittance generally decreases with increasing wavelength, the first band edge having a midpoint at a wavelength La; and for the second optically reflective wall, comprises second and third band edges with the transmittance generally decreasing with increasing wavelength along the second band edge and generally increasing with increasing wavelength along the third band edge, the second and third band edges having midpoints at respective wavelengths Lb and Lc, wherein L1<La<Lb<Lc.

10. The optical system of claim 9, wherein for the at least one of s- and p-polarized incident lights incident in the incident plane at the same first incident angle, the optical transmittances at the midpoints of the first, second, and third band edges are between about 20% and about 60%.

11. The optical system of claim 9, wherein the first band edge is a right band edge of a transmission band of the first optically reflective wall, the transmission band having a corresponding full width at half maximum of greater than about 30 nm and less than about 300 nm.

12. The optical system of claim 9, wherein the second band edge is a right band edge of a transmission band of the second optically reflective wall, the transmission band having a corresponding full width at half maximum of greater than about 30 nm and less than about 300 nm.

13. The optical system of claim 9, wherein the third band edge is a left band edge of a transmission band of the second optically reflective wall, the transmission band having a corresponding full width at half maximum of greater than about 30 nm and less than about 300 nm.

14. An optical system comprising:

at least one light source configured to emit a light having at least a first wavelength;

a recycling optical cavity configured to receive the emitted light from the at least one light source and comprising at least first and second optically reflective walls, at least a portion of each of the first and second optically reflective walls comprising a plurality of microlayers numbering at least 10 in total, each of the microlayers having an average thickness of less than about 500 nm; and at least one optical detector configured to receive and detect light exiting the recycling optical cavity and having at least the first wavelength and a different second wavelength;

such that for at least one of s- and p-polarized incident lights incident in an incident plane, optical transmittances of the first and second optically reflective walls versus wavelength comprise first, second and third transmittance bands having corresponding and non-overlapping full width at half maxima FWHM1, FWHM2, and FWHM3, wherein:

at a first incident angle, only FWHM1 comprises the first wavelength and none of the three FWHMs comprises the second wavelength;

at a second incident angle different than the first incident angle, only FWHM2 comprises the first wavelength and none of the three FWHMs comprises the second wavelength; and at a third incident angle different than the first and second incident angles, only FWHM3 comprises the second wavelength and none of the three FWHMs comprises the first wavelength.

* * * * *